United States Patent
Konno et al.

(10) Patent No.: US 11,411,250 B2
(45) Date of Patent: Aug. 9, 2022

(54) ELECTROLYTIC SOLUTION AND ELECTROCHEMICAL DEVICE

(71) Applicant: Showa Denko Materials Co., Ltd., Tokyo (JP)

(72) Inventors: Kaoru Konno, Tokyo (JP); Kumpei Yamada, Tokyo (JP); Ryuichiro Fukuta, Tokyo (JP)

(73) Assignee: Showa Denko Materials Co., Ltd., Tokyo (JP)

(*) Notice: Subject to any disclaimer, the term of this patent is extended or adjusted under 35 U.S.C. 154(b) by 184 days.

(21) Appl. No.: 16/615,653

(22) PCT Filed: May 31, 2018

(86) PCT No.: PCT/JP2018/021013
§ 371 (c)(1),
(2) Date: Nov. 21, 2019

(87) PCT Pub. No.: WO2018/221671
PCT Pub. Date: Dec. 6, 2018

(65) Prior Publication Data
US 2020/0152398 A1 May 14, 2020

(30) Foreign Application Priority Data
Jun. 1, 2017 (WO) .................. PCT/JP2017/020472
Mar. 14, 2018 (JP) .............................. JP2018-046550

(51) Int. Cl.
*H01M 10/056* (2010.01)
*H01M 10/0567* (2010.01)
(Continued)

(52) U.S. Cl.
CPC .......... *H01M 10/0567* (2013.01); *C07F 7/12* (2013.01); *C07F 7/122* (2013.01); *C07F 7/123* (2013.01);
(Continued)

(58) Field of Classification Search
CPC ...... H01M 4/133; H01M 4/386; H01M 4/397; H01M 10/0567; H01G 11/62; H01G 11/32; C07F 7/1804
See application file for complete search history.

(56) References Cited

U.S. PATENT DOCUMENTS 3,053,874 A    9/1962  Pepe
8,076,032 B1 * 12/2011 West ................. H01M 10/0567
                                                        429/313
(Continued)

FOREIGN PATENT DOCUMENTS

CN    102372732 A    3/2012
CN    102723528 A    10/2012
(Continued)

*Primary Examiner* — Amanda C. Walke
(74) *Attorney, Agent, or Firm* — Faegre Drinker Biddle & Reath LLP

(57) ABSTRACT

One aspect of the present invention provides an electrolytic solution comprising a compound represented by the following formula (1):

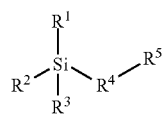

(1)

wherein $R^1$ to $R^3$ each independently represent an alkyl group or a fluorine atom, $R^4$ represents an alkylene group, and $R^5$ represents an organic group containing a sulfur atom.

7 Claims, 14 Drawing Sheets

(51) Int. Cl.
  *H01G 11/32* (2013.01)
  *H01G 11/62* (2013.01)
  *H01M 4/133* (2010.01)
  *H01M 4/38* (2006.01)
  *H01M 10/0525* (2010.01)
  *C07F 7/12* (2006.01)
  *H01M 4/02* (2006.01)

(52) U.S. Cl.
  CPC .............. *H01G 11/32* (2013.01); *H01G 11/62* (2013.01); *H01M 4/133* (2013.01); *H01M 4/386* (2013.01); *H01M 4/387* (2013.01); *H01M 10/0525* (2013.01); *H01M 2004/027* (2013.01); *H01M 2004/028* (2013.01)

(56) References Cited

U.S. PATENT DOCUMENTS

| | | | |
|---|---|---|---|
| 9,437,371 | B2 | 9/2016 | Pena Hueso et al. |
| 9,466,857 | B1 | 10/2016 | Cheng et al. |
| 10,155,778 | B2* | 12/2018 | Syvret .................. C07F 7/12 |
| 10,273,253 | B1* | 4/2019 | Zhou .................... C07F 7/1892 |
| 10,355,313 | B2* | 7/2019 | Pe a Hueso .......... C07F 7/1804 |
| 10,590,149 | B2* | 3/2020 | Syvret .................. C07F 7/14 |
| 2013/0183576 | A1* | 7/2013 | Suguro ................ H01M 4/134 429/163 |
| 2013/0236777 | A1* | 9/2013 | Taki .................... H01M 10/052 429/200 |
| 2014/0356735 | A1 | 12/2014 | Pena Hueso et al. |
| 2016/0190644 | A1* | 6/2016 | Takase ................. H01M 4/405 429/333 |
| 2016/0308249 | A1 | 10/2016 | Johnson et al. |
| 2017/0301953 | A1 | 10/2017 | Pena Hueso et al. |
| 2018/0034106 | A1 | 2/2018 | Schmidt |
| 2018/0261879 | A1* | 9/2018 | Johnson ............... H01M 10/0525 |
| 2019/0348713 | A1* | 11/2019 | Yu ....................... H01M 10/0525 |

FOREIGN PATENT DOCUMENTS

| | | |
|---|---|---|
| CN | 103401019 A | 11/2013 |
| CN | 105037928 A | 11/2015 |
| CN | 105742702 A | 7/2016 |
| CN | 106025358 A | 10/2016 |
| CN | 106795184 A | 5/2017 |
| EP | 3 038 194 A1 | 6/2016 |
| JP | H03-236168 A | 10/1991 |
| JP | 2001-185212 A | 7/2001 |
| JP | 2015-005329 A | 1/2015 |
| JP | 2016-126855 A | 7/2016 |
| KR | 10-2013-0137941 A | 12/2013 |
| WO | WO-2012/029653 A1 | 3/2012 |
| WO | WO-2014/059709 A1 | 4/2014 |
| WO | WO-2016/006488 A1 | 1/2016 |
| WO | WO-2016/054621 A1 | 4/2016 |
| WO | WO-2016/146925 A1 | 9/2016 |

* cited by examiner

ELECTROLYTIC SOLUTION AND ELECTROCHEMICAL DEVICE

TECHNICAL FIELD

The present invention relates to an electrolytic solution and an electrochemical device.

BACKGROUND ART

In recent years, high-performance electrochemical devices are needed such as non-aqueous electrolytic solution secondary batteries, representative examples including lithium ion secondary batteries, and capacitors, due to the widespread use of portable electronic devices and electric vehicles. As means for improving the performance of an electrochemical device, for example, a method of adding a predetermined additive to an electrolytic solution has been studied. In Patent Literature 1, there is disclosed an electrolytic solution for a non-aqueous electrolytic solution battery which contains a specific siloxane compound in order to improve cycle characteristics and internal resistance characteristics.

CITATION LIST

Patent Literature

Patent Literature 1: Japanese Unexamined Patent Publication No. 2015-005329

SUMMARY OF INVENTION

Technical Problem

In order to enhance the durability of such an electrochemical device and use the electrochemical device for a long period of time, it is important to improve the cycle characteristics particularly among the characteristics of the electrochemical device. However, in regard to the development of electrochemical devices, there is room for further improvement in terms of improving the cycle characteristics.

Then, an object of this invention is to provide an electrolytic solution that can improve the cycle characteristics of the electrochemical device. In addition, another object of the present invention is to provide an electrochemical device excellent in the cycle characteristics.

Solution to Problem

The present inventors have found that the cycle characteristics of the electrochemical device can be improved by the specific compound containing silicon atoms and sulfur atoms being contained in the electrolytic solution.

In addition, other characteristics which are required for electrochemical devices also include enhancing the discharge rate characteristics and reducing the internal resistance of the battery. Furthermore, it is also required to suppress an increase in volume (expansion) of the electrochemical device and an increase in direct current resistance (DCR: Direct Current Resistance) with time. It has also been found by the present inventors that these characteristics of the electrochemical device can be improved by the compound being contained in the electrolytic solution.

The present invention provides, as a first aspect, an electrolytic solution comprising a compound represented by the following formula (1):

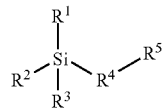

(1)

wherein $R^1$ to $R^3$ each independently represent an alkyl group or a fluorine atom, $R^4$ represents an alkylene group, and $R^5$ represents an organic group comprising a sulfur atom.

In the first aspect, the number of silicon atoms in one molecule of the compound represented by the formula (1) is preferably one.

$R^5$ is preferably a group represented by any of the following formula (2), formula (3) and formula (4):

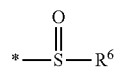

(2)

wherein $R^6$ represents an alkyl group, and * represents a bond;

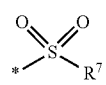

(3)

wherein $R^7$ represents an alkyl group, and * represents a bond; and

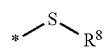

(4)

wherein $R^8$ represents an alkyl group, and * represents a bond.

At least one of $R^1$ to $R^3$ is preferably a fluorine atom.

A content of the compound represented by the formula (1) is preferably 10% by mass or less based on a total amount of the electrolytic solution.

The present invention provides, as a second aspect, an electrochemical device comprising a positive electrode, a negative electrode and the above electrolytic solution.

The negative electrode preferably comprises a carbon material. The carbon material preferably comprises graphite. The negative electrode preferably further comprises a material comprising at least one element of the group consisting of silicon and tin.

The electrochemical device is preferably a non-aqueous electrolytic solution secondary battery or a capacitor.

Advantageous Effects of Invention

According to the present invention, an electrolytic solution that can improve cycle characteristics of an electrochemical device can be provided. In addition, according to the present invention, an electrochemical device excellent in the cycle characteristics can be provided.

DESCRIPTION OF EMBODIMENTS

Figure 1:
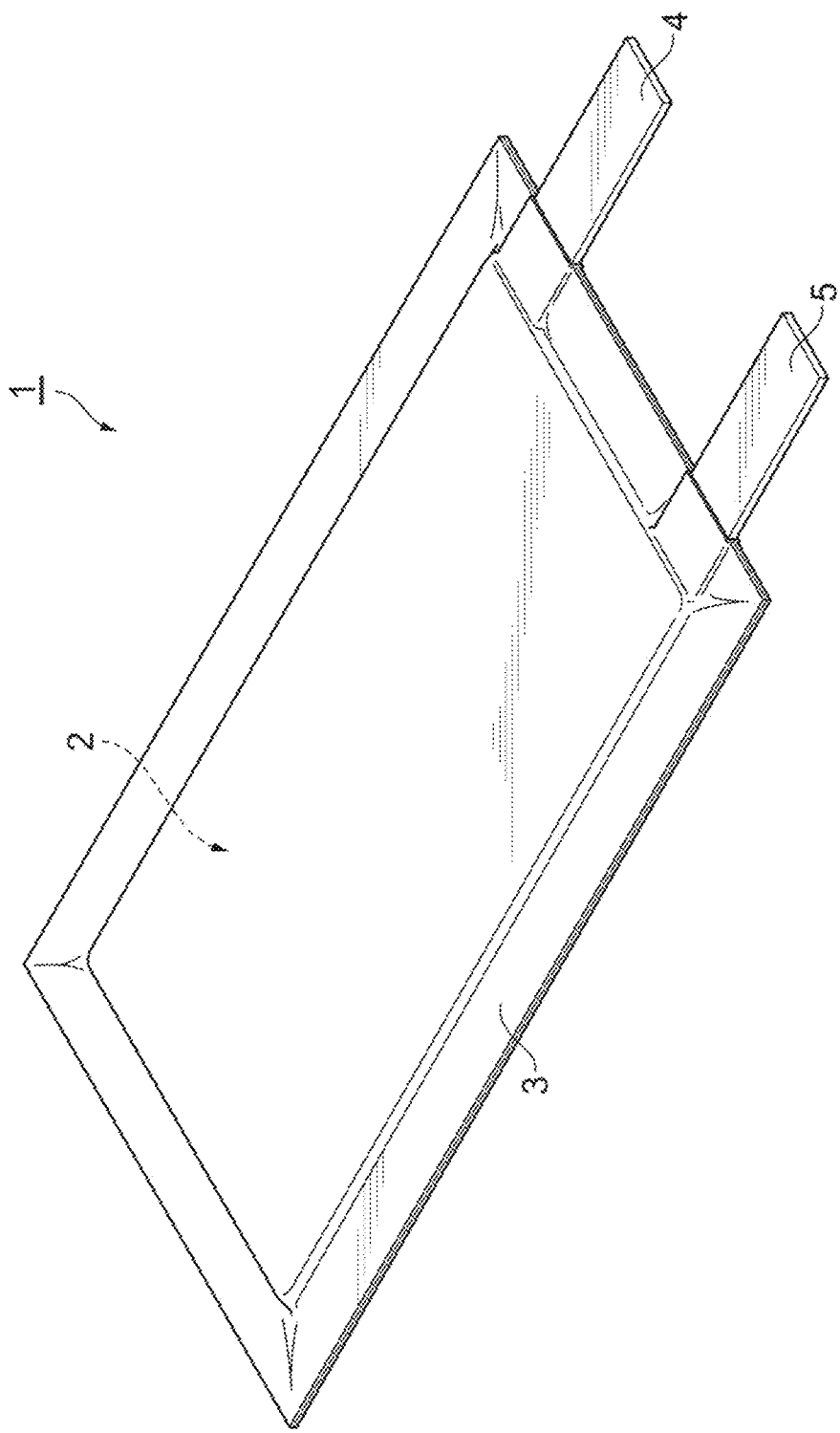
FIG. 1 shows a perspective view showing a non-aqueous electrolytic solution secondary battery which is an electrochemical device according to one embodiment.

Embodiments of the present invention will be described below, appropriately referring to the drawings. However, the present invention is not limited to the following embodiments.

FIG. 1 shows a perspective view showing an electrochemical device according to one embodiment. In the present embodiment, the electrochemical device is a non-aqueous electrolytic solution secondary battery. As shown in FIG. 1, the non-aqueous electrolytic solution secondary battery 1 comprises: an electrode group 2 including a positive electrode, a negative electrode and a separator; and a bag-shaped battery outer package 3 which accommodates the electrode group 2. A positive electrode current collector tab 4 and a negative electrode current collector tab 5 are provided on the positive electrode and the negative electrode, respectively. The positive electrode current collector tab 4 and the negative electrode current collector tab 5 protrude from the inside of the battery outer package 3 to the outside so that the positive electrode and the negative electrode can be electrically connected to the outside of the non-aqueous electrolytic solution secondary battery 1, respectively. The battery outer package 3 is filled with an electrolytic solution (not illustrated). The non-aqueous electrolytic solution secondary battery 1 may be a battery having another shape (coin type, cylindrical type, layered type and the like) than that of the so-called "laminate type" as described above.

The battery outer package 3 may be a container which is formed of, for example, a laminate film. The laminate film may be, for example, a laminated film in which a resin film such as a polyethylene terephthalate (PET) film, a foil of metal such as aluminum, copper and stainless steel, and a sealant layer made from polypropylene or the like are laminated in this order.

Figure 2:
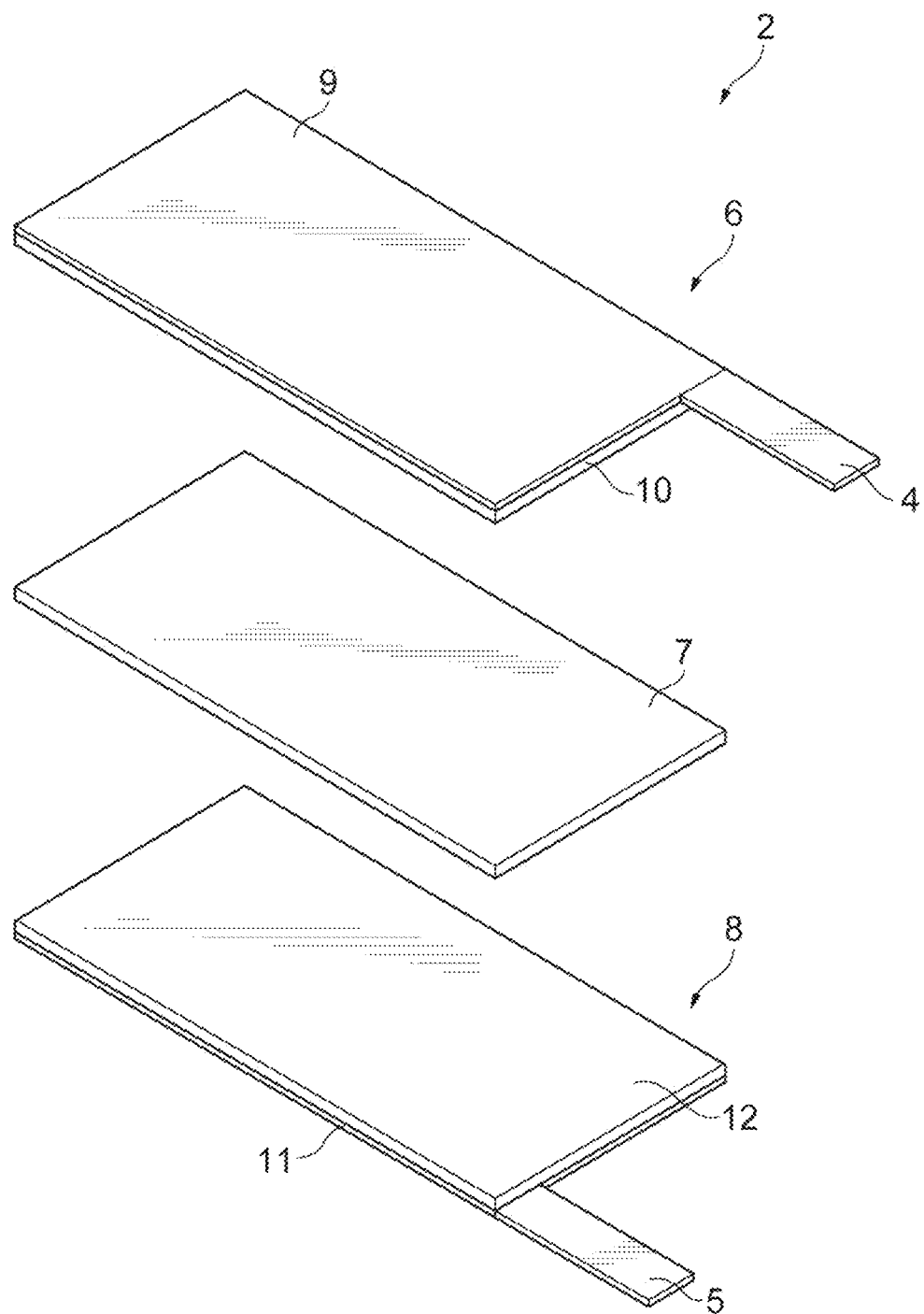
FIG. 2 shows an exploded perspective view showing an electrode group of the secondary battery shown in FIG. 1.

FIG. 2 shows an exploded perspective view showing one embodiment of the electrode group 2 in the non-aqueous electrolytic solution secondary battery 1 shown in FIG. 1. As shown in FIG. 2, the electrode group 2 has a positive electrode 6, a separator 7 and a negative electrode 8, in this order. The positive electrode 6 and the negative electrode 8 are arranged so that a positive electrode mixture layer 10 side and a negative electrode mixture layer 12 side face the separator 7, respectively.

The positive electrode 6 has a positive electrode current collector 9, and a positive electrode mixture layer 10 provided on the positive electrode current collector 9. The positive electrode current collector 9 is provided with the positive electrode current collector tab 4.

The positive electrode current collector 9 is formed from, for example, aluminum, titanium, stainless steel, nickel, baked carbon, an electroconductive polymer, or electroconductive glass. The positive electrode current collector 9 may have a surface of aluminum, copper or the like which has been treated with carbon, nickel, titanium, silver or the like, for the purpose of improving adhesiveness, electroconductivity and oxidation resistance. The thickness of the positive electrode current collector 9 is, for example, 1 to 50 μm from the viewpoint of electrode strength and energy density.

In one embodiment, the positive electrode mixture layer 10 contains a positive electrode active material, an electroconductive agent, and a binder. The thickness of the positive electrode mixture layer 10 is, for example, 20 to 200 μm.

The positive electrode active material may be, for example, lithium oxide. Examples of the lithium oxide include $Li_xCoO_2$, $Li_xNiO_2$, $Li_xMnO_2$, $Li_xCo_yNi_{1-y}O_2$, $Li_xCo_yM_{1-y}O_z$, $Li_xNi_{1-y}M_yO_z$, $Li_xMn_2O_4$ and $Li_xMn_{2-y}M_yO_4$ (wherein in each formula, M represents at least one element selected from the group consisting of Na, Mg, Sc, Y, Mn, Fe, Co, Cu, Zn, Al, Cr, Pb, Sb, V and B (provided that M is an element different from the other elements in each formula); and x=0 to 1.2, y=0 to 0.9, and z=2.0 to 2.3). The lithium oxide represented by $Li_xNi_{1-y}M_yO_z$ may be $Li_xNi_{1-(y1+y2)}Co_{y1}Mn_{y2}O_z$ (provided that x and z are the same as those described above, and y1=0 to 0.9, y2=0 to 0.9, and y1+y2=0 to 0.9), and may be, for example, $LiNi_{1/3}Co_{1/3}Mn_{1/3}O_2$, $LiNi_{0.5}Co_{0.2}Mn_{0.3}O_2$, $LiNi_{0.6}Co_{0.2}Mn_{0.2}O_2$ and $LiNi_{0.8}Co_{0.1}Mn_{0.1}O_2$. The lithium oxide represented by $Li_xNi_{1-y}M_yO_z$ may be $Li_xNi_{1-(y3+y4)}Co_{y3}Al_{y4}O_z$ (provided that x and z are the same as those described above, and y3=0 to 0.9, y4=0 to 0.9, and y3+y4=0 to 0.9), and may be, for example, $LiNi_{0.8}Co_{0.15}Al_{0.05}O_2$.

The positive electrode active material may be, for example, lithium phosphate. Examples of the lithium phosphate include lithium manganese phosphate ($LiMnPO_4$), lithium iron phosphate ($LiFePO_4$), lithium cobalt phosphate ($LiCoPO_4$), and lithium vanadium phosphate ($Li_3V_2(PO_4)_3$).

The content of the positive electrode active material may be 80% by mass or more, or 85% by mass or more based on the total amount of the positive electrode mixture layer, and 99% by mass or less.

The electroconductive agent may be carbon materials such as carbon black such as acetylene black and ketjen black, graphite, graphene and a carbon nanotube. The content of the electroconductive agent may be, for example, 0.01% by mass or more, 0.1% by mass or more, or 1% by mass or more based on the total amount of the positive electrode mixture layer, and may be 50% by mass or less, 30% by mass, or 15% by mass or less.

Examples of the binder include: resins such as polyethylene, polypropylene, polyethylene terephthalate, polymethyl methacrylate, polyimide, aromatic polyamide, cellulose and nitrocellulose; rubbers such as SBR (styrene-butadiene rubber), NBR (acrylonitrile-butadiene rubber), fluorine rubber, isoprene rubber, butadiene rubber and ethylene-propylene rubber; thermoplastic elastomers such as styrene/butadiene/styrene block copolymers or hydrogenated products thereof, EPDM (ethylene/propylene/diene terpolymer), styrene/ethylene/butadiene/ethylene copolymers, and styrene/isoprene/styrene block copolymers or hydrogenated products thereof; soft resins such as syndiotactic-1,2-polybutadiene, polyvinyl acetate, ethylene/vinyl acetate copolymers, and propylene α-olefin copolymers; fluorine-containing resins such as polyvinylidene fluoride (PVDF), polytetrafluoroethylene, fluorinated polyvinylidene fluoride, polytetrafluoroethylene/ethylene copolymers, polytetrafluoroethylene/vinylidene fluoride copolymers; resins having a nitrile group-containing monomer as a monomer unit; and polymer compositions having an ion conductivity of an alkali metal ion (for example, lithium ion).

The content of the binder may be, for example, 0.1% by mass or more, 1% by mass or more, or 1.5% by mass or more based on the total amount of the positive electrode mixture layer, and may be 30% by mass or less, 20% by mass or less, or 10% by mass or less.

The separator 7 is not limited in particular as long as the separator electronically insulates between the positive electrode 6 and the negative electrode 8, and on the other hand, allows ions to pass therethrough, and has resistances to an oxidizing property in the positive electrode 6 side and to a reducing property in the negative electrode 8 side. Examples of the material (quality of material) of the separator 7 include resins and inorganic substances.

The resins include olefin-based polymers, fluorine-based polymers, cellulose-based polymers, polyimide and nylon. The separator 7 is preferably a porous sheet or a nonwoven fabric which is formed from a polyolefin such as polyethylene and polypropylene, from the viewpoint of being stable with respect to the electrolytic solution and excellent in liquid retentivity.

The inorganic substances include: oxides such as alumina and silicon dioxide; nitrides such as aluminum nitride and silicon nitride; and sulfates such as barium sulfate and calcium sulfate. The separator 7 may be, for example, a separator in which a fibrous or particulate inorganic substance is bonded to a thin film substrate such as a nonwoven fabric, a woven fabric and a microporous film.

The negative electrode 8 has a negative electrode current collector 11, and a negative electrode mixture layer 12 provided on the negative electrode current collector 11. The negative electrode current collector 11 is provided with a negative electrode current collector tab 5.

The negative electrode current collector 11 is formed from copper, stainless steel, nickel, aluminum, titanium, baked carbon, an electroconductive polymer, electroconductive glass, an aluminum-cadmium alloy, or the like. The negative electrode current collector 11 may be one in which the surface of copper, aluminum or the like is treated with carbon, nickel, titanium, silver or the like, for the purpose of improving adhesiveness, electroconductivity, and resistance to reduction. The thickness of the negative electrode current collector 11 is, for example, 1 to 50 μm, from the viewpoint of the electrode strength and the energy density.

The negative electrode mixture layer 12 contains, for example, a negative electrode active material and a binder.

The negative electrode active material is not limited in particular as long as the active material is a material which can occlude and release lithium ions. Examples of the negative electrode active material include: carbon materials; metal composite oxides; oxides or nitrides of Group 4 elements such as tin, germanium and silicon; a simple substance of lithium; lithium alloys such as lithium aluminum alloys; and metals which can form an alloy with lithium, such as Sn and Si. The negative electrode active material is preferably at least one selected from the group consisting of the carbon material and the metal composite oxide, from the viewpoint of safety. The negative electrode active material may be one type alone or a mixture of two or more of the materials. The shape of the negative electrode active material may be, for example, a particulate shape.

The carbon materials include: amorphous carbon materials; natural graphite; composite carbon materials in which a film of amorphous carbon material is formed on natural graphite; and artificial graphite (one that is obtained by baking raw materials of resins such as epoxy resin and phenol resin, or pitch-based raw materials which are obtained from petroleum, coal and the like). The metal composite oxide preferably contains one or both of titanium and lithium, and more preferably contains lithium, from the viewpoint of charge/discharge characteristics at high current density.

The negative electrode active material may further include a material containing at least one element selected from the group consisting of silicon and tin. The material containing at least one element selected from the group consisting of silicon and tin may be a compound containing at least one element selected from the group consisting of a simple substance of silicon or tin, silicon and tin. The compound may be an alloy containing at least one element selected from the group consisting of silicon and tin, and is, for example, an alloy containing at least one selected from the group consisting of nickel, copper, iron, cobalt, manganese, zinc, indium, silver, titanium, germanium, bismuth, antimony and chromium, in addition to silicon and tin. The compound containing at least one element selected from the group consisting of silicon and tin may be an oxide, a nitride or a carbide, and specifically may be, for example, a silicon oxide such as SiO, $SiO_2$ and LiSiO, a silicon nitride such as $Si_3N_4$ and $Si_2N_2O$, a silicon carbide such as SiC, and a tin oxide such as SnO, $SnO_2$ and LiSnO.

The negative electrode mixture layer 12 preferably contains a carbon material as a negative electrode active material, more preferably contains graphite, and further preferably contains a mixture of a carbon material and a material containing at least one element selected from the group consisting of silicon and tin, and particularly preferably contains a mixture of graphite and silicon oxide, from the viewpoint of further improving the cycle characteristics of the electrochemical device. The content of the material containing at least one element selected from the group consisting of silicon and tin (silicon oxide) in the mixture may be 1% by mass or more, or 3% by mass or more, and may be 30% by mass or less, based on the total amount of the mixture.

The content of the negative electrode active material may be 80% by mass or more or 85% by mass or more, and may be 99% by mass or less, based on the total amount of the negative electrode mixture layer.

The binder and its content may be the same as the binder and its content in the positive electrode mixture layer described above.

The negative electrode mixture layer 12 may further contain a thickening agent in order to adjust the viscosity. The thickening agent is not limited in particular, and may be carboxymethyl cellulose, methyl cellulose, hydroxymethyl cellulose, ethyl cellulose, polyvinyl alcohol, oxidized starch, phosphorylated starch, casein, salts thereof, and the like. The thickening agent may be one type alone or a mixture of two or more of the materials.

In the case where the negative electrode mixture layer 12 contains the thickening agent, the content is not limited in particular. The content of the thickening agent may be 0.1% by mass or more, is preferably 0.2% by mass or more, and is more preferably 0.5% by mass or more, based on the total amount of the negative electrode mixture layer, from the viewpoint of coating properties of the negative electrode mixture layer. The content of the thickening agent may be 5% by mass or less, is preferably 3% by mass or less, and is more preferably 2% by mass or less, based on the total amount of the negative electrode mixture layer, from the viewpoint of suppressing a decrease in battery capacity or an increase in resistance between the negative electrode active materials.

In one embodiment, the electrolytic solution contains a compound represented by the following formula (1), an electrolyte salt and a non-aqueous solvent,

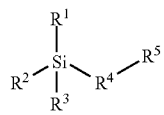

(1)

wherein $R^1$ to $R^3$ each independently represent an alkyl group or a fluorine atom, $R^4$ represents an alkylene group, and $R^5$ represents an organic group containing a sulfur atom.

The number of carbon atoms of the alkyl group represented by $R^1$ to $R^3$ may be 1 or more and 3 or less. $R^1$ to $R^3$ may be a methyl group, an ethyl group or a propyl group, and may be any of a straight-chain group and a branched-chain group. At least one of $R^1$ to $R^3$ is preferably a fluorine atom.

The number of carbon atoms of the alkylene group represented by $R^4$ may be 1 or more, or 2 or more, and 5 or less, or 4 or less. The alkylene group represented by $R^4$ may be a methylene group, an ethylene group, a propylene group, a butylene group or a pentylene group, and may be any of a straight-chain group and a branched-chain group.

$R^5$ may be a group represented by the following formula (2) in one embodiment, from the viewpoint of further improving the cycle characteristics of the electrochemical device,

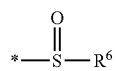

(2)

wherein $R^6$ represents an alkyl group; the alkyl group may be the same as the alkyl group represented by $R^1$ to $R^3$ described above; and * represents a bond.

$R^5$ may also be a group represented by the following formula (3) in another embodiment, from the viewpoint of further improving the cycle characteristics of the electrochemical device,

(3)

wherein $R^7$ represents an alkyl group; the alkyl group may be the same as the alkyl group represented by $R^1$ to $R^3$ described above; and * represents a bond.

$R^5$ may also be a group represented by the following the formula (4) in another embodiment, from the viewpoint of further improving the cycle characteristics of the electrochemical device,

(4)

wherein $R^8$ represents an alkyl group; the alkyl group may be the same as the alkyl group represented by $R^1$ to $R^3$ described above; and * represents a bond.

In one embodiment, the number of silicon atoms in one molecule of the compound represented by the formula (1) is one. In other words, in one embodiment, an organic group represented by $R^5$ does not contain a silicon atom.

A content of the compound represented by the formula (1) is preferably 0.001% by mass or more, based on a total amount of the electrolytic solution, and is more preferably 0.005% by mass or more, and is further preferably 0.01% by mass or more, from the viewpoint of further improving the cycle characteristics of the electrochemical device. From the same viewpoint, the content of the compound represented by the formula (1) is preferably 10% by mass or less, is more preferably 7% by mass or less, is further preferably 5% by mass or less, and is particularly preferably 3% by mass or less, based on the total amount of the electrolytic solution. The content of the compound represented by the formula (1) is preferably 0.001 to 10% by mass, 0.001 to 7% by mass, 0.001 to 5% by mass, 0.001 to 3% by mass, 0.005 to 10% by mass, 0.005 to 7% by mass, 0.005 to 5% by mass, 0.005 to 3% by mass, 0.01 to 10% by mass, 0.01 to 7% by mass, 0.01 to 5% by mass, or 0.01 to 3% by mass, based on the total amount of the electrolytic solution, from the viewpoint of further improving the cycle characteristics of the electrochemical device.

The electrolyte salt may be a lithium salt, for example. Examples of the lithium salt may be at least one selected from the group consisting of $LiPF_6$, $LiBF_4$, $LiClO_4$, $LiB(C_6H_5)_4$, $LiCH_3SO_3$, $CF_3SO_2OLi$, $LiN(SO_2F)_2$ (Li[FSI], lithium bis(fluorosulfonyl)imide), $LiN(SO_2CF_3)_2$ (Li[TFSI], lithium bis(trifluoromethane sulfonyl)imide), and $LiN(SO_2CF_2CF_3)_2$. The lithium salt preferably contains $LiPF_6$, from the viewpoint of further being excellent in solubility to a solvent, and in charge/discharge characteristics, output characteristics, cycle characteristics and the like of a second battery.

The concentration of the electrolyte salt is preferably 0.5 mol/L or higher, is more preferably 0.7 mol/L or higher, is further preferably 0.8 mol/L or higher, based on the total amount of the non-aqueous solvent, and is preferably 1.5 mol/L or lower, is more preferably 1.3 mol/L or lower, and is further preferably 1.2 mol/L or lower, from the viewpoint of being excellent in charge/discharge characteristics.

The examples of the non-aqueous solvent include ethylene carbonate, propylene carbonate, dimethyl carbonate, diethyl carbonate, methyl ethyl carbonate, γ-butyl lactone, acetonitrile, 1,2-dimethoxyethane, dimethoxymethane, tetrahydrofuran, dioxolane, methylene chloride, and methyl acetate. The non-aqueous solvent may be one type alone or a mixture of two or more of these solvents, and is preferably the mixture of two or more.

The electrolytic solution may further contain other materials than the compound represented by the formula (1), the electrolyte salt and the non-aqueous solvent. Other materials may be, for example, a heterocyclic compound containing nitrogen, sulfur, or nitrogen and sulfur, a cyclic carboxylic acid ester, a fluorine-containing cyclic carbonate, other compounds having an unsaturated bond in a molecule, or the like.

The present inventors have studied compounds which have various structures and functional groups, and as a result, have revealed that the cycle characteristics have been remarkably improved by applying the compound represented by the above formula (1) to the electrolytic solution. The present inventors assume the effects of using the compound represented by the formula (1) in the electrolytic solution to be as follows. The compound represented by the formula (1) forms a stable film on the positive electrode or the negative electrode. Thereby, the lowering of the output characteristics is suppressed, which originates in the deposition of a decomposed product of the electrolytic solution on the positive electrode or the negative electrode. Furthermore, the lowering of the capacity and the increase of the resistance (Including increase of direct current resistance (discharge DCR) at the time of discharge) are suppressed, which originate in the decomposition of the electrolyte salt. As a result, the cycle characteristics of the non-aqueous electrolytic solution secondary battery 1 are improved. Furthermore, the compound represented by the formula (1) itself has a skeleton containing Si, and thereby generation of gas derived from the compound is reduced, and the volume expansion can be suppressed which occurs when the non-aqueous electrolytic solution secondary battery 1 is stored at high temperature.

Subsequently, a method for manufacturing the non-aqueous electrolytic solution secondary battery 1 will be described. The method for manufacturing the non-aqueous electrolytic solution secondary battery 1 includes: a first step of obtaining the positive electrode 6; a second step of obtaining the negative electrode 8; a third step of accommodating the electrode group 2 in the battery outer package 3; and a fourth step of injecting an electrolytic solution into the battery outer package 3.

In the first step, the positive electrode 6 is obtained by: dispersing a material to be used for the positive electrode mixture layer 10 in a dispersion medium by using a kneader, a disperser or the like to obtain a slurry-like positive electrode mixture; then applying the positive electrode mixture onto the positive electrode current collector 9 by a doctor blade method, a dipping method, a spray method or the like; and then volatilizing the dispersion medium. After volatilization of the dispersion medium, a step of compression molding using a roll press may be provided as needed. The above steps from the application of the positive electrode mixture to the volatilization of the dispersion medium may be performed a plurality of times, and thereby the positive electrode mixture layer 10 may be formed as a positive electrode mixture layer having a multilayer structure. The dispersion medium may be water, 1-methyl-2-pyrrolidone (hereinafter also referred to as NMP), or the like.

The second step may be the same step as the first step described above, and the method of forming the negative electrode mixture layer 12 on the negative electrode current collector 11 may be the same method as the first step described above.

In the third step, the separator 7 is sandwiched between the produced positive electrode 6 and negative electrode 8, and the electrode group 2 is formed. Next, the electrode group 2 is accommodated in the battery outer package 3.

In the fourth step, the electrolytic solution is injected into the battery outer package 3. The electrolytic solution can be prepared, for example, by firstly dissolving an electrolyte salt in a non-aqueous solvent, and then dissolving other materials thereinto.

As for another embodiment, the electrochemical device may be a capacitor. The capacitor may include, similarly to the non-aqueous electrolytic solution secondary battery 1 described above, the electrode group including the positive electrode, the negative electrode and the separator, and a bag-shaped battery outer package which accommodates the electrode group. The details of each component in the capacitor may be the same as those of the non-aqueous electrolytic solution secondary battery 1.

EXAMPLES

The present invention will be specifically described below with reference to Examples, but the present invention is not limited to these Examples.

Example 1

[Production of Positive Electrode]

Fibrous graphite (1% by mass) and acetylene black (AB) (1% by mass) of electroconductive agents, and a binder (3% by mass) were sequentially added to and mixed with lithium cobaltate (95% by mass) of a positive electrode active material. To the obtained mixture, NMP of a dispersion medium was added, the resultant mixture was kneaded, and thereby a slurry-like positive electrode mixture was prepared. A predetermined amount of this positive electrode mixture was evenly and uniformly applied to an aluminum foil which was a positive electrode current collector and had a thickness of 20 μm. After that, the dispersion medium was volatilized, then the resultant mixture was compressed to a density of 3.6 g/cm$^3$ by pressing, and a positive electrode was obtained.

[Production of Negative Electrode]

A binder and carboxymethylcellulose of a thickening agent were added to graphite of a negative electrode active material. Mass ratios among the materials were set to be negative electrode active material:binder:thickening agent=98:1:1. To the obtained mixture, water was added as a dispersion medium, and the mixture was kneaded to prepare a slurry-like negative electrode mixture. A predetermined amount of this negative electrode mixture was evenly and uniformly applied to a rolled copper foil which was a negative electrode current collector and had a thickness of 10 μm. After that, the dispersion medium was volatilized, then the resultant mixture was compressed to a density of 1.6 g/cm³ by pressing, and a negative electrode was obtained.

[Production of Lithium Ion Secondary Battery]

The positive electrode which was cut into a 13.5 cm² square was sandwiched by polyethylene porous sheets (trade name: Hypore (registered trademark), manufactured by Asahi Kasei Corporation and thickness of 30 μm) which were separators; then, the negative electrode which was cut into a 14.3 cm² square was further overlapped thereon; and an electrode group was produced. This electrode group was accommodated in a container (battery outer package) formed of a laminate film made from aluminum (trade name: aluminum laminate film, manufactured by Dai Nippon Printing Co., Ltd.). Subsequently, 1 mL of an electrolytic solution was added into the container, the container was heat-welded, and the lithium ion secondary battery for evaluation was produced. As the electrolytic solution, a solution was used which was prepared by adding 1% by mass of vinylene carbonate (VC) with respect to the total amount of the following mixed solution, and 1% by mass (based on the total amount of electrolytic solution) of the compound A which was represented by the following formula (5) into the mixed solution which contained ethylene carbonate containing 1 mol/L of LiPF$_6$, dimethyl carbonate and diethyl carbonate.

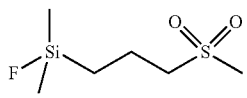

(5)

Comparative Example 1

A lithium ion secondary battery was produced in the same manner as in Example 1, except that the compound A was not used in Example 1.

[Initial Charge/Discharge]

The produced lithium ion battery was subjected to the initial charge/discharge by the following method. Firstly, constant current charge was performed up to an upper limit voltage of 4.2 V at a current value of 0.1 C in an environment of 25° C., and then constant-voltage charge was performed at 4.2 V. The charge termination condition was set at a current value of 0.01 C. After that, constant current discharge was performed at a current value of 0.1 C to a final voltage of 2.5 V. This charge/discharge cycle was repeated three times ("C" used as a unit of current value means "current value (A)/battery capacity (Ah)").

[Evaluation of Cycle Characteristics (Upper Limit Voltage of 4.2 V)]

Figure 3:
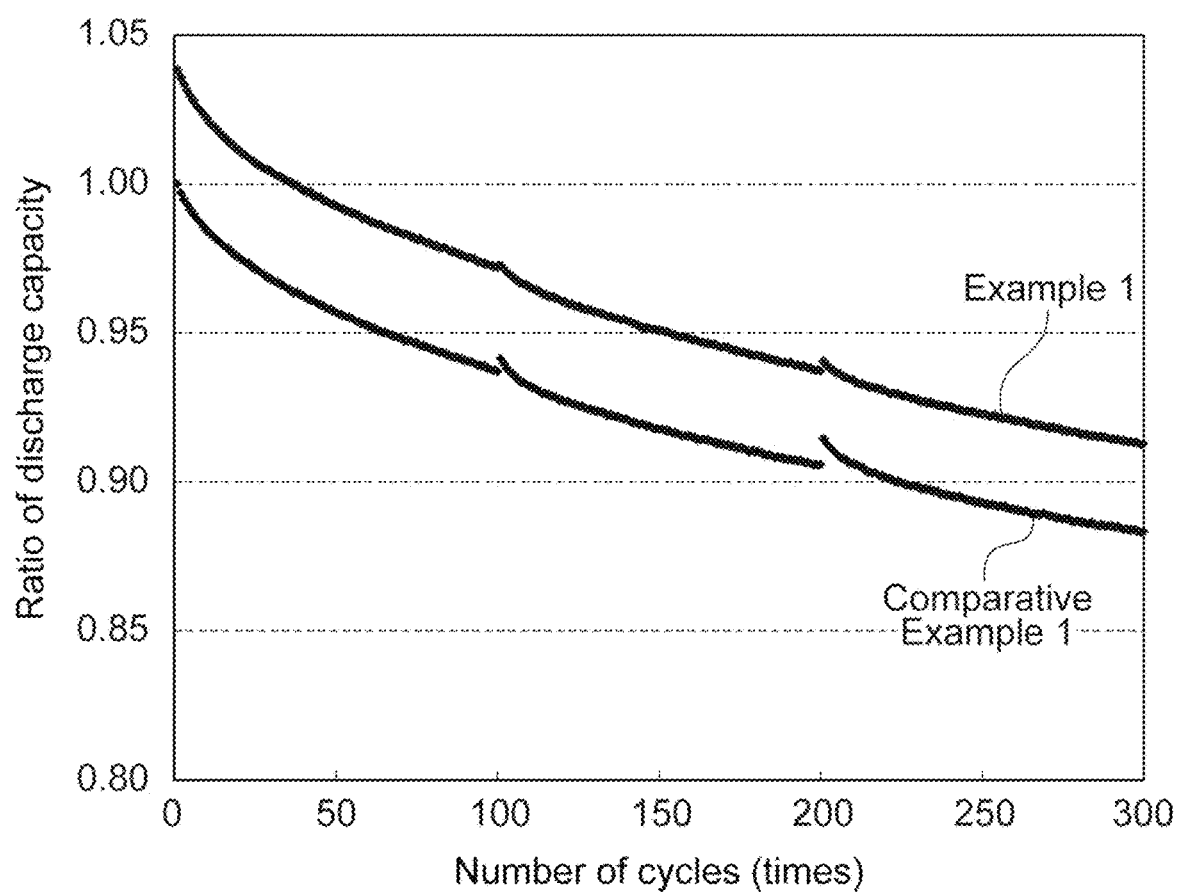
FIG. 3 shows a graph showing evaluation results of cycle characteristics of Example 1 and Comparative Example 1.

After the initial charge/discharge, the cycle characteristics of each of the secondary batteries in Example 1 and Comparative Example 1 were evaluated by a cycle test in which the charge/discharge was repeated. As for a charging pattern, the secondary batteries of Example 1 and Comparative Example 1 were subjected to the constant current charge at a current value of 0.5 C up to an upper limit voltage of 4.2 V, and then were subjected to the constant-voltage charge at 4.2 V, in an environment of 45° C. The charge termination condition was set at a current value of 0.05 C. As for discharge, the constant current discharge was performed at 1 C up to 2.5 V, and the discharge capacity was determined. This series of charge/discharge was repeated 300 cycles, and the discharge capacity was measured each time of the charge/discharge. The discharge capacity after the charge/discharge in the first cycle in Comparative Example 1 was determined to be 1, and relative values of the discharge capacities (ratio of discharge capacity) in Example 1 and Comparative Example 1 in each cycle were determined. FIG. 3 shows the relationship between the number of cycles and the relative values of the discharge capacities. The ratio of discharge capacity after 300 cycles in Example 1 is higher than the ratio of discharge capacity after the 300 cycles in Comparative Example 1, and it is understood that Example 1 is excellent in the cycle characteristics as compared with Comparative Example 1.

Example 2

A lithium ion secondary battery was produced in the same manner as in Example 1, except that silicon oxide was further added as the negative electrode active material in Example 1, and the negative electrode was produced. Mass ratios among the negative electrode active material, the binder and the thickening agent in the negative electrode were set to be graphite:silicon oxide:binder:thickening agent=92:5:1.5:1.5.

Examples 3 to 5

Lithium ion secondary batteries were produced in the same manner as in Example 1, except that the contents of the compound A in Example 2 were changed to 0.1% by mass (Example 3), 0.5% by mass (Example 4), and 3% by mass (Example 5) respectively, based on the total amount of the electrolytic solution.

Comparative Example 2

A lithium ion secondary battery was produced in the same manner as in Example 2, except that the compound A was not used in Example 2.

Comparative Example 3

A lithium ion secondary battery was produced in the same manner as in Example 2, except that 4-fluoro-1,3-dioxolan-2-one (fluoroethylene carbonate; FEC) instead of the compound A in Example 2 was added in an amount of 1% by mass based on the total amount of the electrolytic solution.

[Initial Charge/Discharge]

Each of the secondary batteries of Examples 2 to 5 and Comparative Examples 2 to 3 was subjected to the initial charge/discharge by the same method as the method in Example 1 and Comparative Example 1.

[Evaluation of Cycle Characteristics (Upper Limit Voltage of 4.2 V)]

Figure 4:
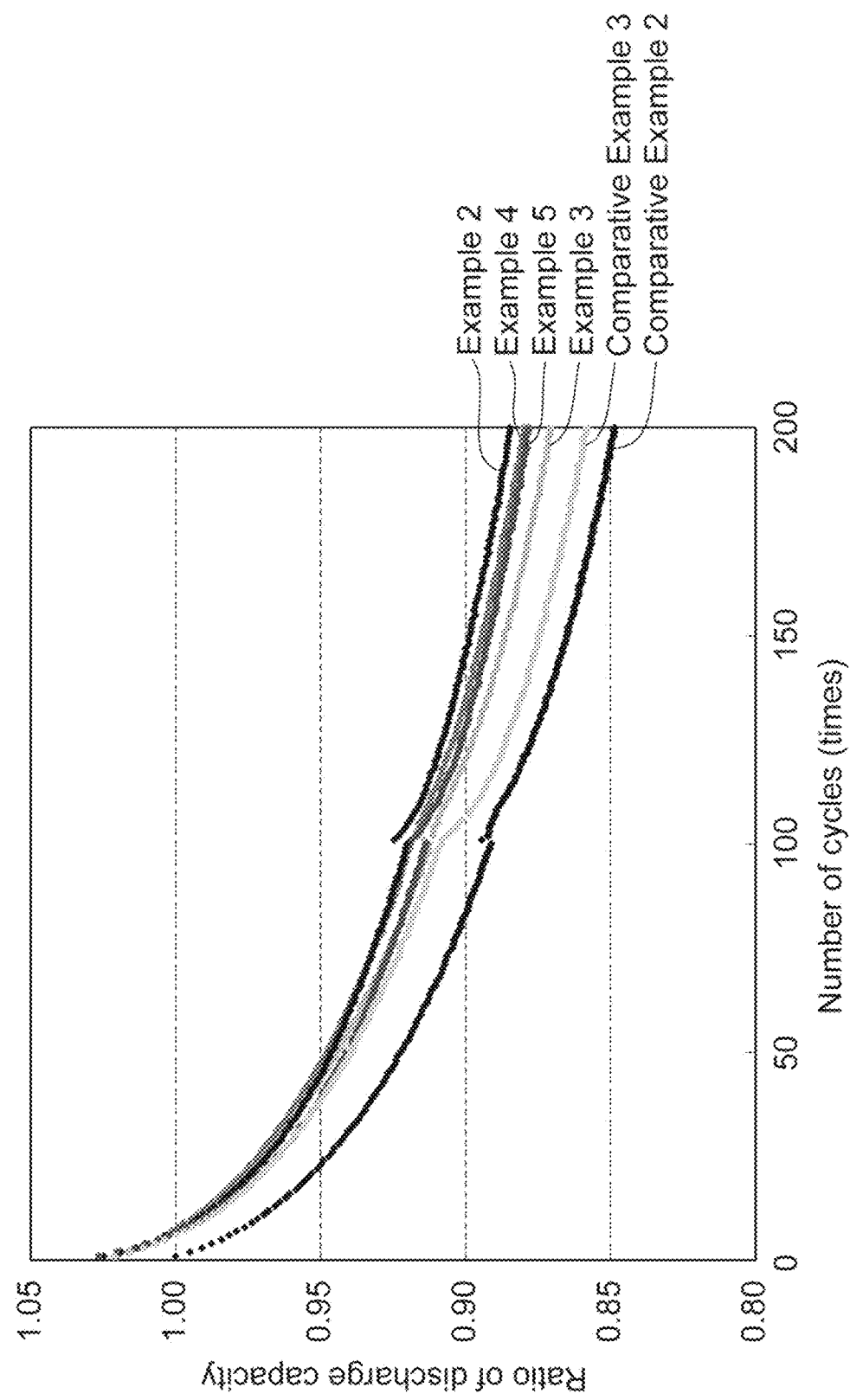
FIG. 4 shows a graph showing evaluation results of the cycle characteristics of Examples 2 to 5 and Comparative Examples 2 to 3.

For each of the secondary batteries of Examples 2 to 5 and Comparative Examples 2 to 3, the cycle characteristics were evaluated by the same method as the evaluation method in Example 1 and Comparative Example 1, except that the number of repetition of charge/discharge (number of cycles) was set at 200 times. The discharge capacity after the charge/discharge in the first cycle in Comparative Example 2 was determined to be 1, and relative values of the discharge capacities (ratio of discharge capacity) in Examples 2 to 5 and Comparative Examples 2 to 3 in each cycle were determined. FIG. 4 shows the relationship between the number of cycles and the relative values of the discharge capacities. The ratio of discharge capacities after 200 cycles in Examples 2 to 5 are higher than the ratios of discharge capacities after the 200 cycles in Comparative Examples 2 to 3, and it is understood that Examples 2 to 5 are excellent in the cycle characteristics as compared with Comparative Examples 2 to 3.

As shown in FIG. 3, in the lithium ion secondary battery of Example 1, in which graphite was used as the negative electrode active material, and furthermore, to which an electrolytic solution containing 1% by mass of the compound A was applied, the evaluation of the cycle characteristics was satisfactory, as compared with the lithium ion secondary battery of Comparative Example 1, to which an electrolytic solution containing no compound A was applied. As shown in FIG. 4, in the lithium ion secondary batteries of Examples 2 to 5, in which a negative electrode active material containing graphite and silicon oxide was used, and furthermore, to which electrolytic solutions containing 1% by mass, 0.1% by mass, 0.5% by mass and 3% by mass of the compound A were applied, the evaluation of cycle characteristics was satisfactory, as compared with the lithium ion secondary batteries of Comparative Example 2 and Comparative Example 3, to which an electrolytic solution containing no compound A was applied. This mechanism is not necessarily clear, but the reason is considered to be because the compound A has formed a stable film on the positive electrode or negative electrode, which has been able to have suppressed the lowering of output characteristics, which originates in the deposition of a decomposed product of the electrolytic solution on the positive electrode or negative electrode. Furthermore, it is considered that the formed stable film suppresses side reactions such as decomposition of the electrolyte in the vicinity of the electrode and a decrease in the capacity of the lithium ion secondary battery, and that the cycle characteristics have been improved by these effects.

[Evaluation of Discharge Rate Characteristics]

For each of the secondary batteries of Example 2 and Comparative Example 2, the output characteristics of the lithium ion secondary battery after the evaluation of the cycle characteristics were evaluated by the method shown below. A constant current charge of 0.2 C was performed up to the upper limit voltage of 4.2 V, and then a constant-voltage charge was performed at 4.2 V. The charge termination condition was set at a current value of 0.02 C. After that, the constant current discharge was performed at a current value of 0.2 C to a final voltage of 2.5 V, and the capacity at the time of this discharge was determined to be the discharge capacity at the current value of 0.2 C. Next, the constant current charge of 0.2 C was performed up to the upper limit voltage of 4.2 V, subsequently the constant-voltage charge was performed at 4.2 V (where the charge termination condition was set at the current value of 0.02 C), then the constant current discharge was performed at a current value of 0.5 C to the final voltage of 2.5 V, and the capacity at the time of this discharge was determined to be the discharge capacity at the current value of 0.5 C. The discharge capacities of 1 C, 2 C and 3 C were evaluated from similar charge/discharge. The output characteristics were computed by the following expression. The evaluation results of Example 2 and Comparative Example 2 are shown in FIG. 5.

Discharge capacity retention rate (%)=(discharge capacity at current values of 0.2 C, 0.5 C, 1 C, 2 C or 3 C/discharge capacity at current value of 0.2 C)×100

Figure 5:
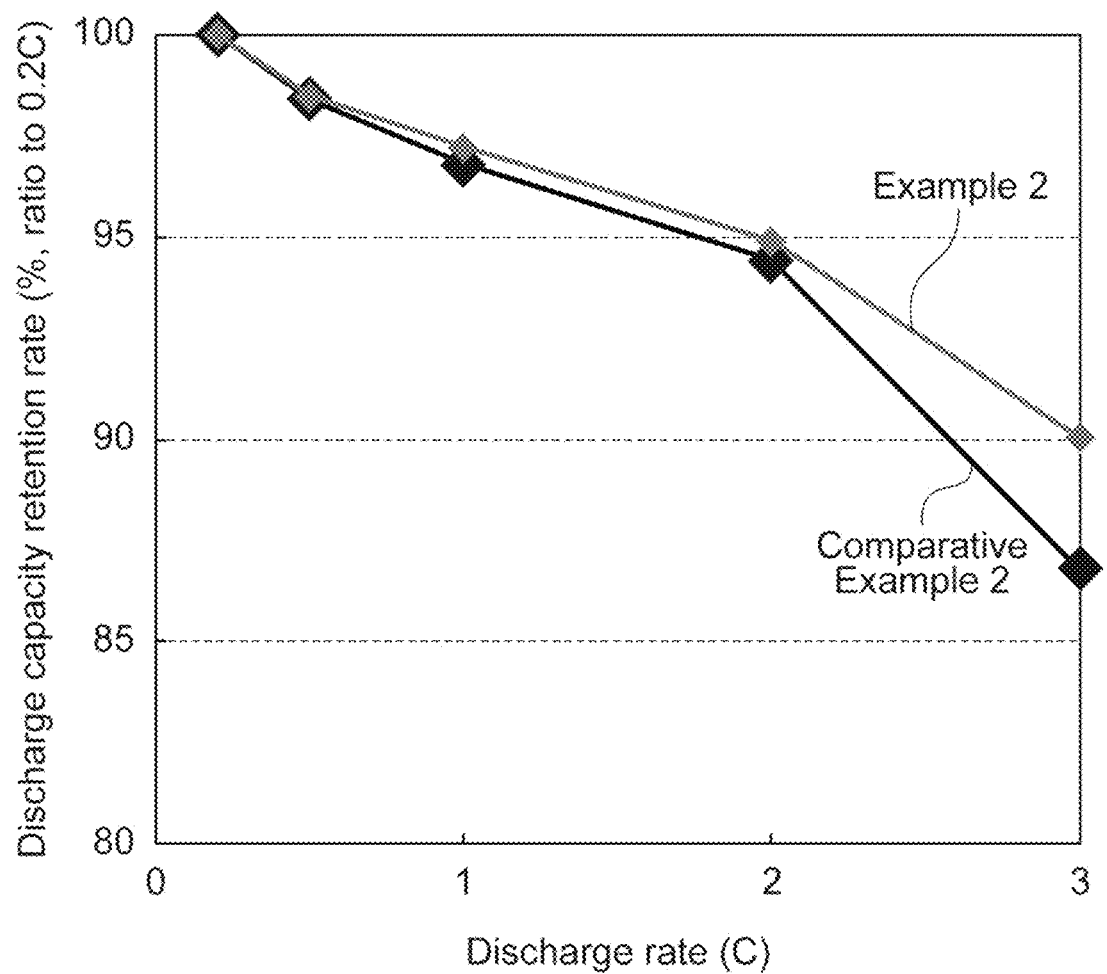
FIG. 5 shows a graph showing evaluation results of discharge rate characteristics of Example 2 and Comparative Example 2.

As shown in FIG. 5, it has become clear that in the lithium ion secondary battery of Example 2, in which graphite and silicon oxide were used as the negative electrode active material, and furthermore, to which the electrolytic solution containing 1% by mass of the compound A was applied, discharge rate characteristics at 3 C rate after the cycle test are improved, as compared with the lithium ion secondary battery of Comparative Example 2, to which an electrolytic solution containing no compound A was applied. The mechanism by which these rate characteristics were improved is not necessarily clear, but the reason is considered to be because similarly to the evaluation of the cycle characteristics, the film which was formed on the positive electrode or negative electrode by the addition of the compound A was stable and had satisfactory ion-conductivity; the decomposition of the electrolytic solution was suppressed along with the film formation; and furthermore, the decomposition of $LiPF_6$ was suppressed by an interaction between the compound A and the lithium salt ($LiPF_6$).

Example 6

[Production of Positive Electrode]

Acetylene black (AB) (5% by mass) of the electroconductive agent, and a binder (4% by mass) were sequentially added to and mixed with lithium nickel cobalt manganate ($LiNi_{1/3}Co_{1/3}Mn_{1/3}O_2$, 91% by mass) of a positive electrode active material. To the obtained mixture, NMP of a dispersion medium was added, the resultant was kneaded, and thereby a slurry-like positive electrode mixture was prepared. A predetermined amount of this positive electrode mixture was evenly and uniformly applied to an aluminum foil which was a positive electrode current collector and had a thickness of 20 μm. After that, the dispersion medium was volatilized, then the resultant mixture was compressed to a density of 2.8 $g/cm^3$ by pressing, and a positive electrode was obtained.

[Production of Negative Electrode]

A negative electrode was obtained by the same method as in Example 1, except that the density at the compression was changed to 1.2 $g/cm^3$.

[Production of Lithium Ion Secondary Battery]

A lithium ion secondary battery for evaluation was produced by the same method as in Example 1. As the electrolytic solution, a solution was used which was prepared by adding 1% by mass of vinylene carbonate (VC) with respect to the total amount of the following mixed solution, and 0.2% by mass (based on total amount of electrolytic solution) of the above compound A, into the mixed solution which contained ethylene carbonate containing 1 mol/L of $LiPF_6$, dimethyl carbonate and diethyl carbonate.

Example 7

A lithium ion secondary battery was produced in the same manner as in Example 6, except that the content of the compound A in Example 6 was changed to 0.5% by mass based on the total amount of the electrolytic solution.

Example 8

A lithium ion secondary battery was produced in the same manner as in Example 6, except that the content of the compound A in Example 6 was changed to 1% by mass based on the total amount of the electrolytic solution.

Comparative Example 4

A lithium ion secondary battery was produced in the same manner as in Example 6, except that the compound A was not used in Example 6.

[Initial Charge/Discharge]

Each of the secondary batteries of Examples 6 to 8 and Comparative Example 4 was subjected to the initial charge/discharge by the same method as the method in Example 1 and Comparative Example 1, except that the final voltage of the constant current discharge was set at 2.7 V.

[Evaluation of Cycle Characteristics (Upper Limit Voltage of 4.2 V)]

Figure 6:
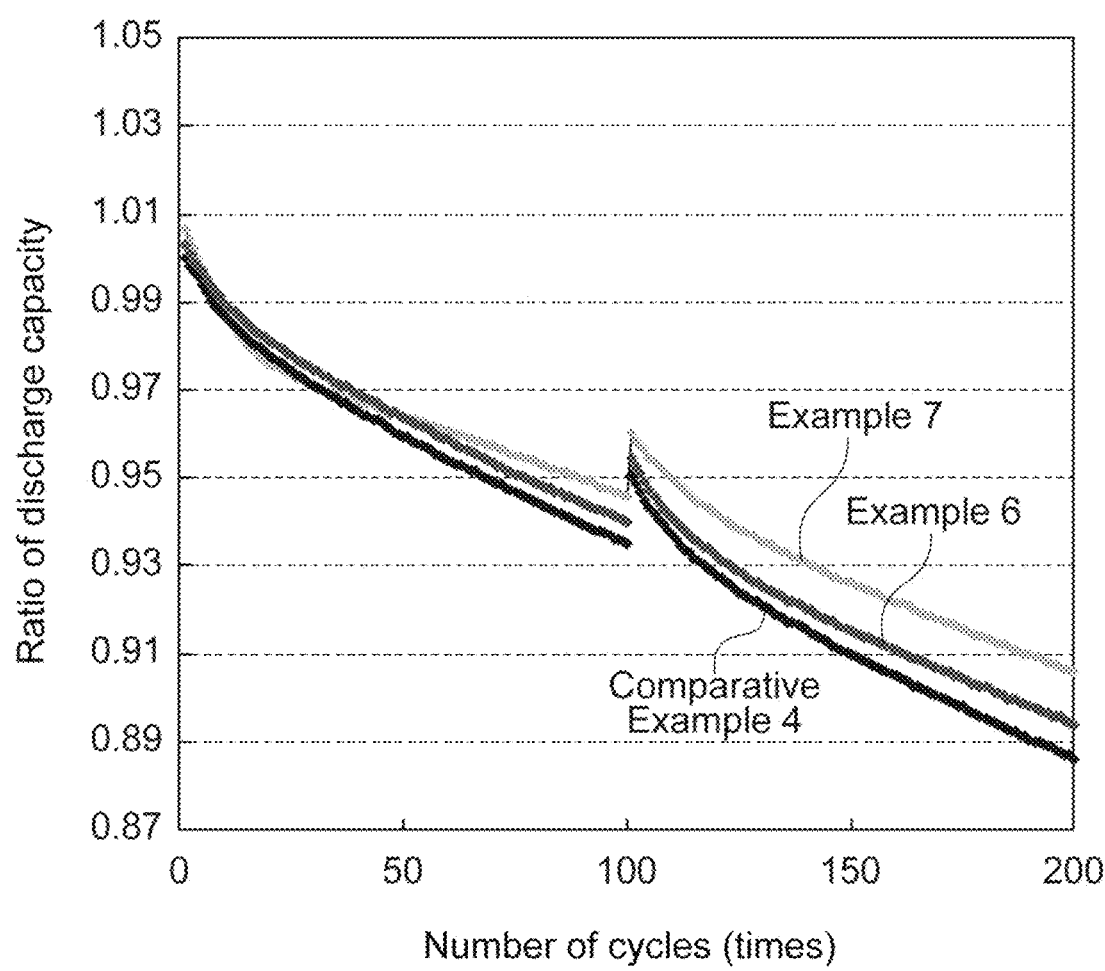
FIG. 6 shows a graph showing evaluation results of the cycle characteristics of Examples 6 to 7 and Comparative Example 4.

After the initial charge/discharge, the cycle characteristics of each of the secondary batteries in Examples 6 to 7 and Comparative Example 4 were evaluated by the cycle test in which the charge/discharge was repeated. As for a charging pattern, the secondary batteries of Examples 6 to 7 and Comparative Example 4 were subjected to the constant current charge at a current value of 1 C up to an upper limit voltage of 4.2 V, and then were subjected to the constant-voltage charge at 4.2 V, in an environment of 50° C. The charge termination condition was set at a current value of 0.01 C. As for discharge, the constant current discharge was performed at 1 C to 2.7 V, and the discharge capacity was determined. This series of charge/discharge was repeated 200 cycles, and the discharge capacity was measured each time of the charge/discharge. The discharge capacity after the charge/discharge in the first cycle in Comparative Example 4 was determined to be 1, and relative values of the discharge capacities (ratio of discharge capacity) in Examples 6 to 7 and Comparative Example 4 in each cycle were determined. FIG. 6 shows the relationship between the number of cycles and the relative values of the discharge capacities. The ratios of discharge capacities after 200 cycles in Examples 6 to 7 are higher than the ratio of discharge capacity after the 200 cycles in Comparative Example 4, and it is understood that Examples 6 to 7 are excellent in the cycle characteristics as compared with Comparative Example 4.

[Evaluation of Cycle Characteristics (Upper Limit Voltage of 4.3 V)]

Figure 7:
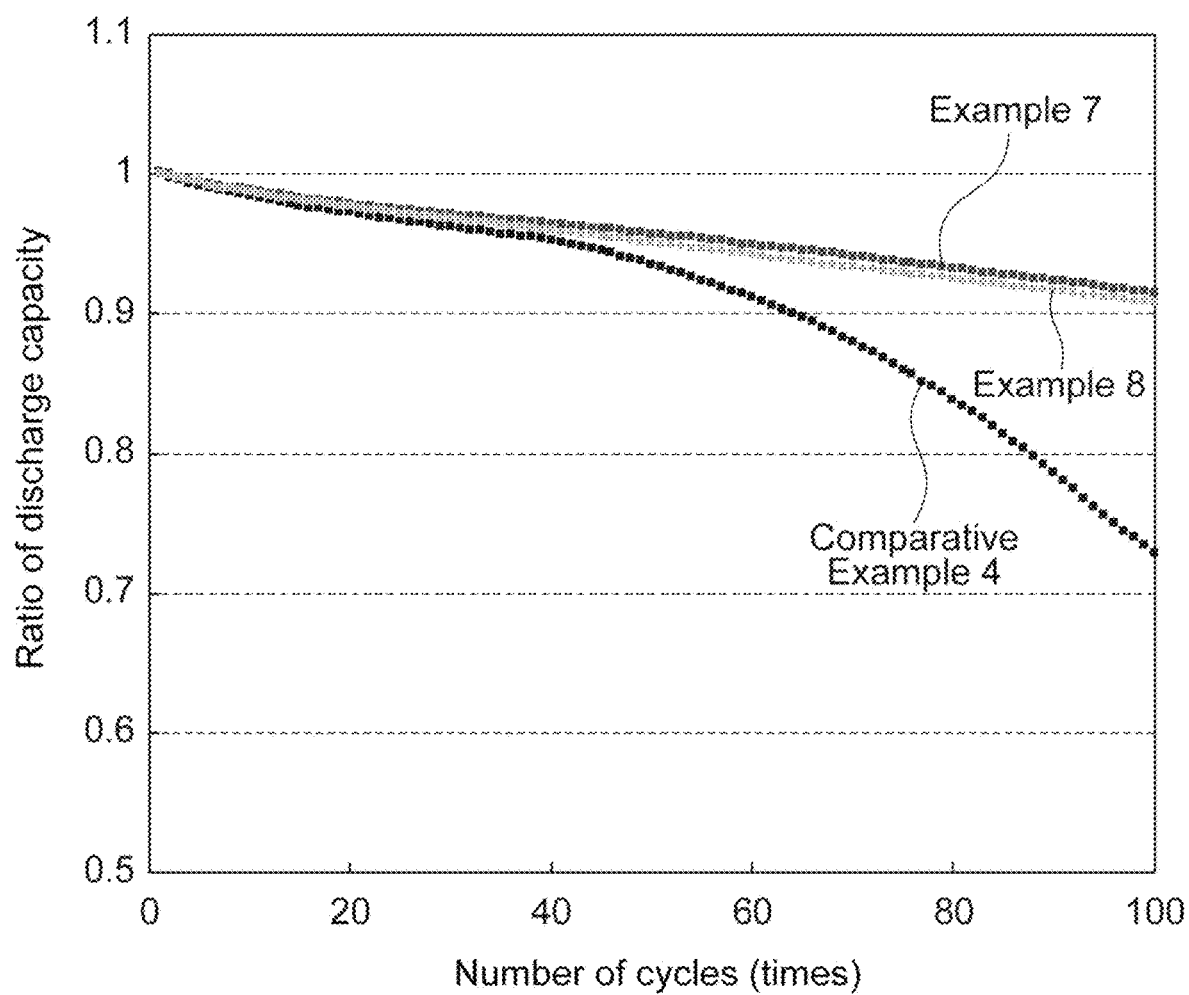
FIG. 7 shows a graph showing evaluation results of the cycle characteristics of Examples 7 to 8 and Comparative Example 4.

For each of the secondary batteries of Examples 7 to 8 and Comparative Example 4, the cycle characteristics were evaluated by the same method as the evaluation method at the time when the upper limit voltage was set at 4.2 V, except that the upper limit voltage was set at 4.3 V, and the number of repetition of charge/discharge (number of cycles) was set at 100 times. The discharge capacity after the charge/discharge in the first cycle in Comparative Example 4 was determined to be 1, and relative values of the discharge capacities (ratio of discharge capacity) in Examples 7 to 8 and Comparative Example 4 in each cycle were determined. FIG. 7 shows the relationship between the number of cycles and the relative values of the discharge capacities. The ratios of discharge capacities after 100 cycles in Examples 7 to 8 are higher than the ratio of discharge capacity after the 100 cycles in Comparative Example 4, and it is understood that Examples 7 to 8 are excellent in the cycle characteristics as compared with Comparative Example 4. In addition, in the case where the upper limit voltage is 4.3 V, the cycle characteristics (discharge capacity) of the secondary battery tend to become lower as compared with the case where the upper limit voltage is 4.2 V, and the cycle characteristics result in being evaluated under severer conditions. A secondary battery which is excellent in cycle characteristics even under the severe conditions is high in the discharge capacity of the battery, and can be said to be a secondary battery of high capacity (high energy density).

Example 9

A lithium ion secondary battery was produced in the same manner as in Example 6, except that the vinylene carbonate (VC) was not used in Example 6.

Example 10

A lithium ion secondary battery was produced by the same method as in Example 9, except that the content of the compound A in Example 9 was changed to 0.5% by mass based on the total amount of the electrolytic solution.

Comparative Example 5

A lithium ion secondary battery was produced in the same manner as in Example 9, except that the compound A was not used in Example 9.

[Initial Charge/Discharge]

Each of the secondary batteries of Examples 9 to 10 and Comparative Example 5 was subjected to the initial charge/discharge by the same method as the method in Examples 6 to 8 and Comparative Example 4.

[Evaluation of Cycle Characteristics (Upper Limit Voltage of 4.2 V)]

Figure 8:
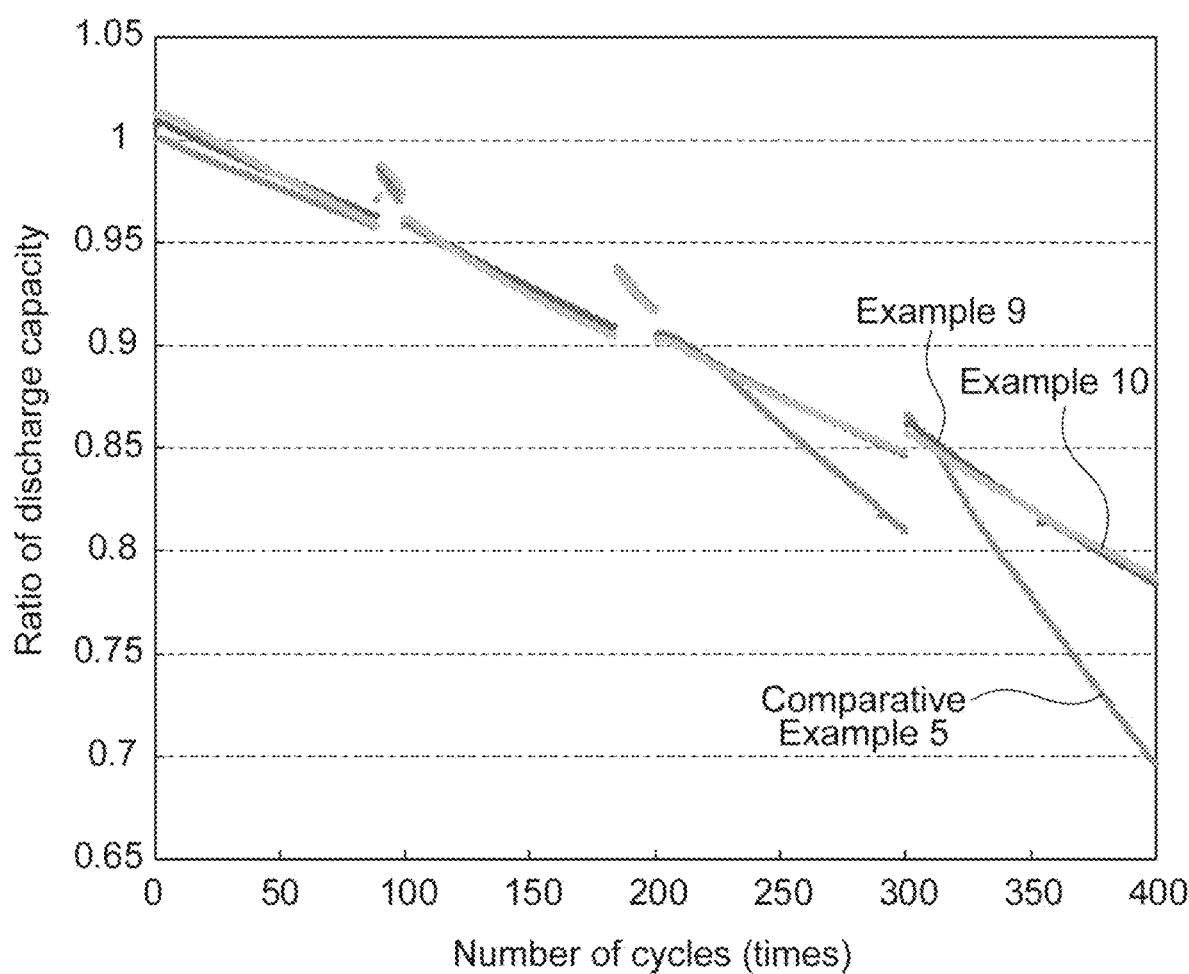
FIG. 8 shows a graph showing evaluation results of the cycle characteristics of Examples 9 to 10 and Comparative Example 5.

For each of the secondary batteries of Examples 9 to 10 and Comparative Example 5, the cycle characteristics were evaluated by the same method as the evaluation method in Examples 6 to 7 and Comparative Example 4 (evaluation method at the time when the upper limit voltage was set at 4.2 V), except that the number of repetition of charge/discharge was set at 400 times. The discharge capacity after the charge/discharge in the first cycle in Comparative Example 5 was determined to be 1, and relative values of the discharge capacities (ratio of discharge capacity) in Examples 9 to 10 and Comparative Example 5 in each cycle were determined. FIG. 8 shows the relationship between the number of cycles and the relative values of the discharge capacities. The ratios of discharge capacities after 400 cycles in Examples 9 to 10 are higher than the ratio of discharge capacity after the 400 cycles in Comparative Example 5, and it is understood that Examples 9 to 10 are excellent in the cycle characteristics as compared with Comparative Example 5.

Example 11

A lithium ion secondary battery was produced in the same manner as in Example 7, except that lithium nickel cobalt manganate ($LiNi_{0.5}Co_{0.2}Mn_{0.3}O_2$) was used as the positive electrode active material, in Example 7.

Example 12

A lithium ion secondary battery was produced in the same manner as in Example 11, except that the content of the compound A in Example 11 was changed to 1.0% by mass based on the total amount of the electrolytic solution.

Comparative Example 6

A lithium ion secondary battery was produced in the same manner as in Example 11, except that the compound A was not used in Example 11.

[Initial Charge/Discharge]

Each of the secondary batteries of Examples 11 to 12 and Comparative Example 6 was subjected to the initial charge/ discharge by the same method as the method in Examples 6 to 8 and Comparative Example 4.

[Evaluation of Cycle Characteristics (Upper Limit Voltage of 4.2 V)]

Figure 9:
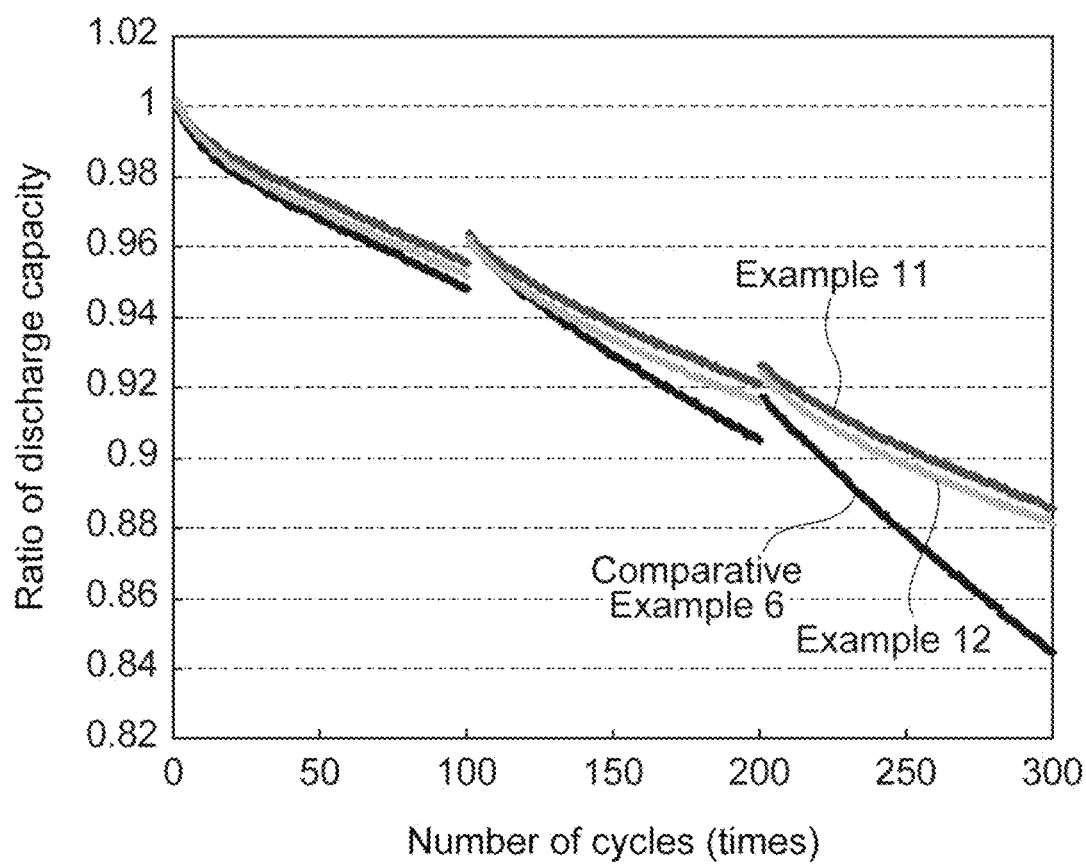
FIG. 9 shows a graph showing evaluation results of the cycle characteristics of Examples 11 to 12 and Comparative Example 6.

For each of the secondary batteries of Examples 11 to 12 and Comparative Example 6, the cycle characteristics were evaluated by the same method as the evaluation method in Examples 6 to 7 and Comparative Example 4, except that the number of repetition of charge/discharge was set at 300 times. The discharge capacity after the charge/discharge in the first cycle in Comparative Example 6 was determined to be 1, and relative values of the discharge capacities (ratio of discharge capacity) in Examples 11 to 12 and Comparative Example 6 in each cycle were determined. FIG. 9 shows the relationship between the number of cycles and the relative values of the discharge capacities. The ratios of discharge capacities after 300 cycles in Examples 11 to 12 are higher than the ratio of discharge capacity after the 300 cycles in Comparative Example 6, and it is understood that Examples 11 to 12 are excellent in the cycle characteristics as compared with Comparative Example 6.

Example 13

[Production of Positive Electrode]

Acetylene black (AB) (5% by mass) of the electroconductive agent, and a binder (4% by mass) were sequentially added to and mixed with lithium nickel cobalt manganate ($LiNi_{0.6}Co_{0.2}Mn_{0.2}O_2$, 91% by mass) of the positive electrode active material. To the obtained mixture, NMP of a dispersion medium was added, the resultant was kneaded, and thereby a slurry-like positive electrode mixture was prepared. A predetermined amount of this positive electrode mixture was evenly and uniformly applied to an aluminum foil which was a positive electrode current collector and had a thickness of 20 m. After that, the dispersion medium was volatilized, then the resultant mixture was compressed to a density of 2.8 $g/cm^3$ by pressing, and a positive electrode was obtained.

[Production of Negative Electrode]

A negative electrode was obtained by the same method as in Example 1.

[Production of Lithium Ion Secondary Battery]

A lithium ion secondary battery for evaluation was produced by the same method as in Example 1. As the electrolytic solution, a solution was used which was prepared by adding 1% by mass of vinylene carbonate (VC) with respect to the total amount of the following mixed solution, and 0.2% by mass (based on total amount of electrolytic solution) of the above compound A, into the mixed solution which contained ethylene carbonate containing 1 mol/L of $LiPF_6$, dimethyl carbonate and diethyl carbonate.

Comparative Example 7

A lithium ion secondary battery was produced in the same manner as in Example 13, except that the compound A was not used in Example 13.

[Initial Charge/Discharge]

Each of secondary batteries of Example 13 and Comparative Example 7 was subjected to the initial charge/discharge by the same method as the method in Examples 6 to 8 and Comparative Example 4.

[Evaluation of Cycle Characteristics (Upper Limit Voltage of 4.2 V)]

Figure 10:
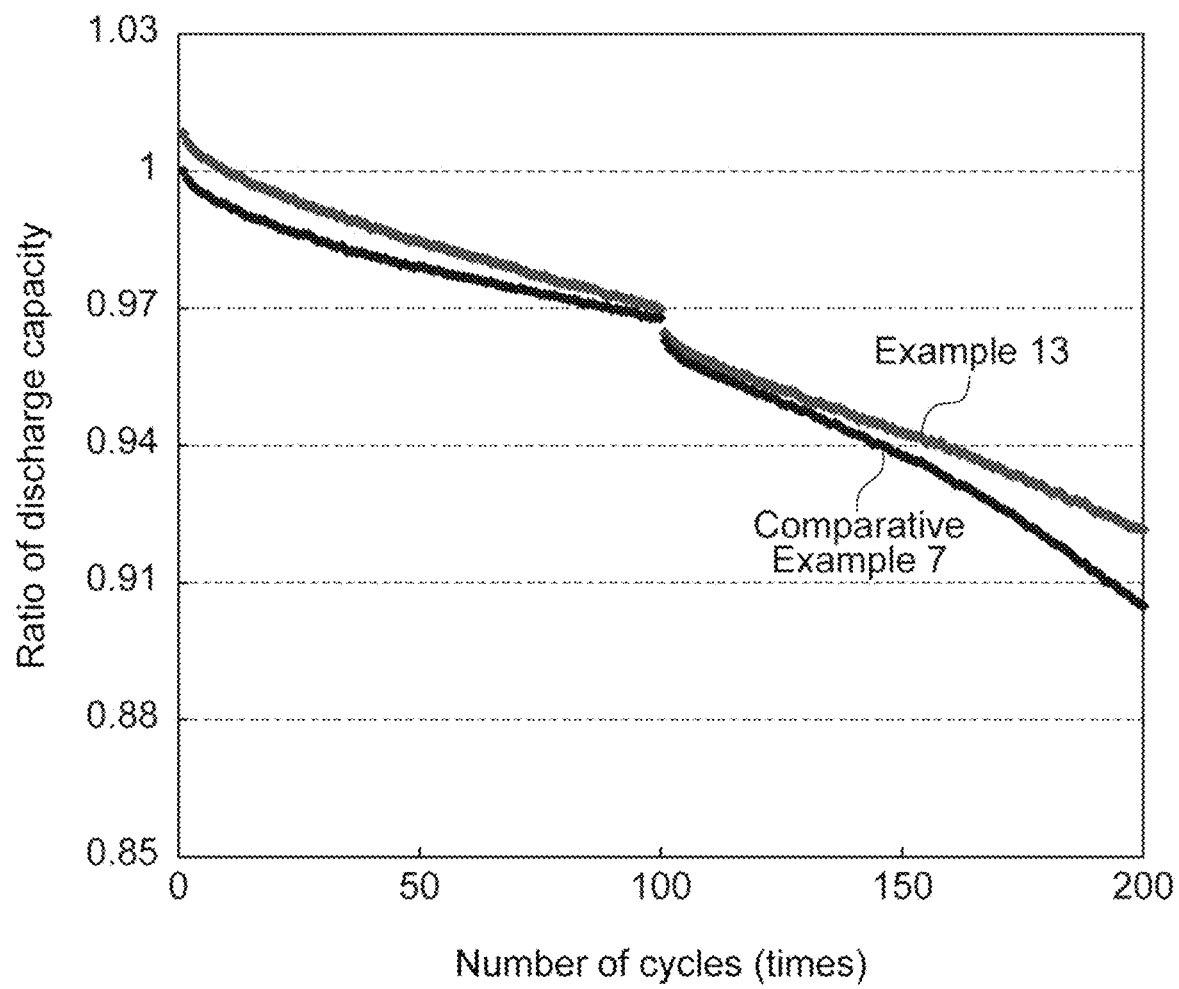
FIG. 10 shows a graph showing evaluation results of the cycle characteristics of Example 13 and Comparative Example 7.

For each of the secondary batteries of Example 13 and Comparative Example 7, the cycle characteristics were evaluated by the same method as the evaluation method in Examples 6 to 7 and Comparative Example 4. The discharge capacity after the charge/discharge in the first cycle in Comparative Example 7 was determined to be 1, and relative values of the discharge capacities (ratio of discharge capacity) in Example 13 and Comparative Example 7 in each cycle were determined. FIG. 10 shows the relationship between the number of cycles and the relative values of the discharge capacities. The ratio of discharge capacity after 200 cycles in Example 13 is higher than the ratio of discharge capacity after the 200 cycles in Comparative Example 7, and it is understood that Example 13 is excellent in the cycle characteristics as compared with Comparative Example 7.

[Evaluation of Discharge Rate Characteristics]

Figure 11:
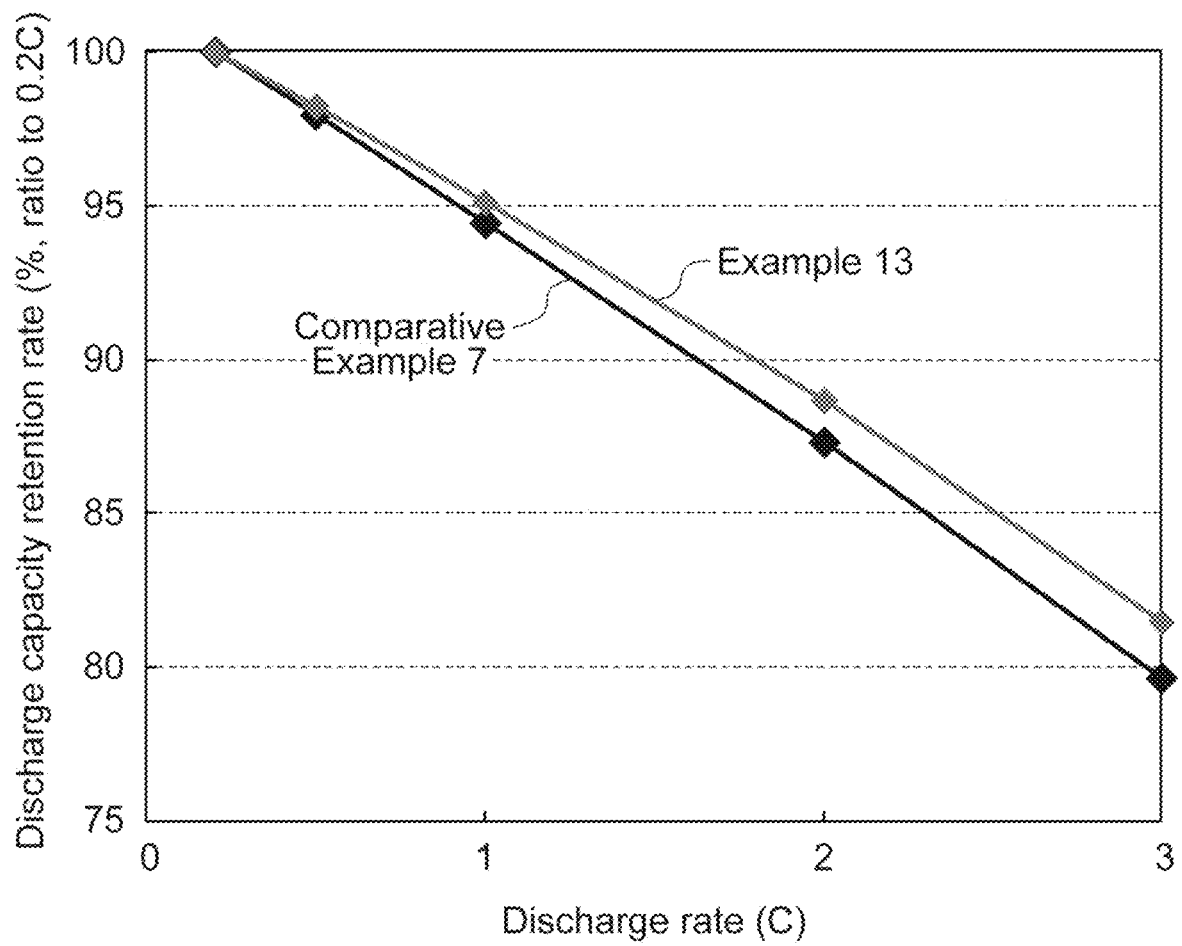
FIG. 11 shows a graph showing evaluation results of the discharge rate characteristics of Example 13 and Comparative Example 7.

For each of the secondary batteries of Example 13 and Comparative Example 7, the discharge rate characteristics were evaluated by the same method as in Example 2 and Comparative Example 2. The measurement results are shown in FIG. 11.

[Resistance Measurement by AC Impedance Measurement]

Figure 12:
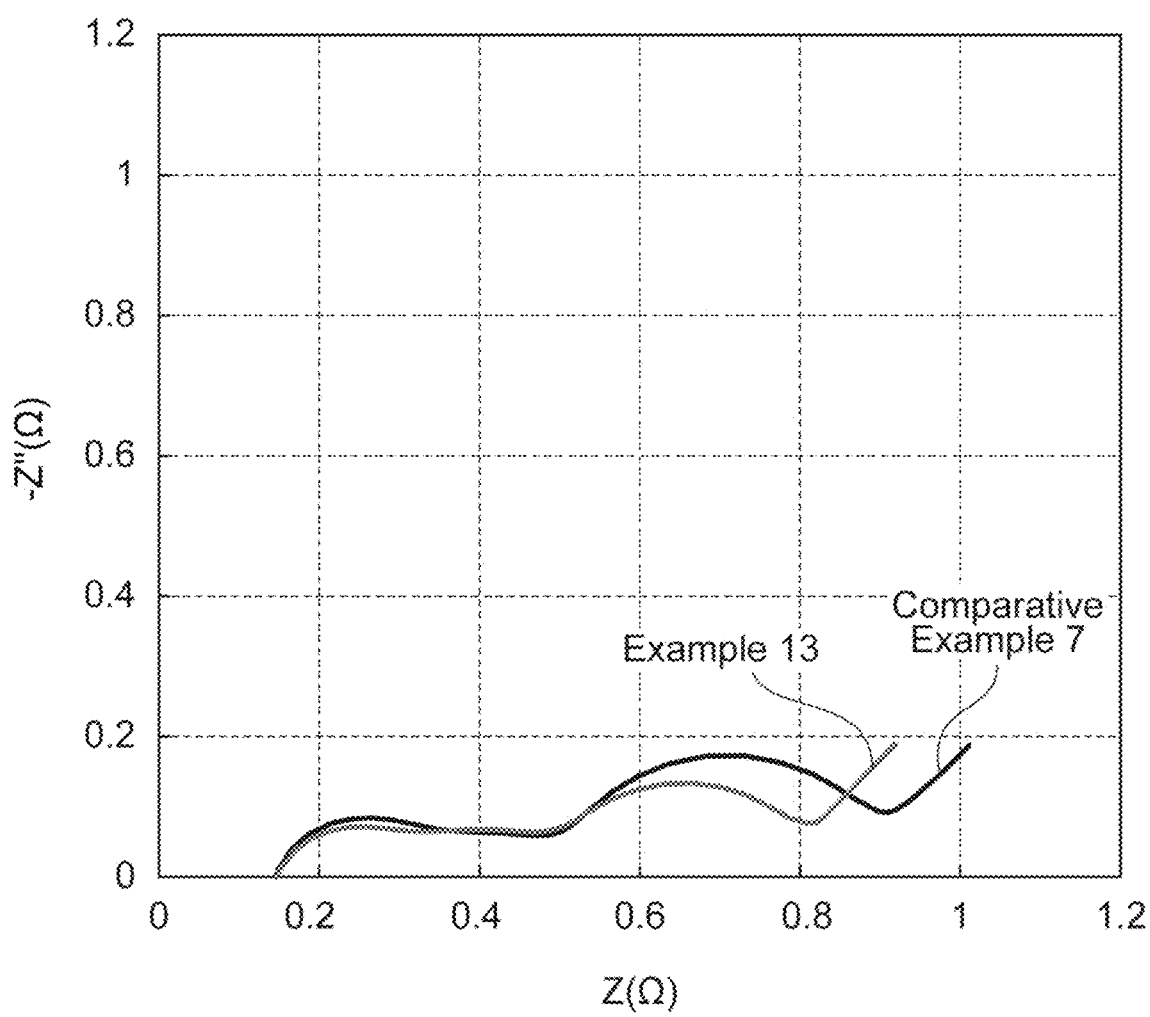
FIG. 12 shows a graph showing measurement results of resistances of Example 13 and Comparative Example 7.

After the initial charge/discharge, the resistances of the lithium ion secondary batteries of Example 13 and Comparative Example 7 were evaluated by AC impedance measurement. The produced lithium ion batteries were subjected to the constant current charge at a current value of 0.1 C in an environment of 25° C. up to the upper limit voltage of 4.2 V, and were each subsequently subjected to the constant-voltage charge at 4.2 V. The charge termination condition was set at a current value of 0.01 C. Resistances of these lithium ion secondary batteries were measured with the use of an AC impedance measuring device (1260 type, manufactured by Solartron Analytical) in a frequency range of 20 mHz to 200 kHz with an amplitude of 10 mV in an environment of 25° C. The measurement results are shown in FIG. 12.

As shown in FIGS. 6 to 10, even in the case where lithium nickel cobalt manganate was used as the positive electrode active material, the cycle characteristics of the lithium ion secondary batteries of Examples 6 to 13 were satisfactory, to which the electrolytic solution containing a predetermined amount of the compound A was applied, as compared with the lithium ion secondary batteries of Comparative Examples 4 to 7, to which the electrolytic solution containing no compound A was applied. The mechanism is not necessarily clear, but the reason is considered to be because the compound A has formed a stable film on the positive electrode, accordingly a fracture of a crystal structure of the positive electrode active material has been suppressed and the lowering of the capacity of the positive electrode has been reduced, and as a result, the cycle characteristics have been improved.

Example 14

[Production of Positive Electrode]

Acetylene black (AB) (3% by mass) of the electroconductive agent and a binder (2% by mass) were sequentially added to and mixed with lithium nickel cobalt aluminate (95% by mass) of the positive electrode active material. To the obtained mixture, NMP of a dispersion medium was added, the resultant mixture was kneaded, and thereby a slurry-like positive electrode mixture was prepared. A predetermined amount of this positive electrode mixture was evenly and uniformly applied to an aluminum foil which was a positive electrode current collector and had a thickness of 20 μm. After that, the dispersion medium was volatilized, then the resultant mixture was compressed to a density of 3.0 g/cm³ by pressing, and a positive electrode was obtained.

[Production of Negative Electrode]

A negative electrode was obtained by the same method as in Example 1.

[Production of Lithium Ion Secondary Battery]

A lithium ion secondary battery for evaluation was produced by the same method as in Example 1. As the electrolytic solution, a solution was used which was prepared by adding 1% by mass of vinylene carbonate (VC) with respect to the total amount of the following mixed solution, and 0.1% by mass (based on total amount of electrolytic solution) of the above compound A, into the mixed solution which contained ethylene carbonate containing 1 mol/L of LiPF$_6$, dimethyl carbonate and diethyl carbonate.

Example 15

A lithium ion secondary battery was produced in the same manner as in Example 14, except that the content of the compound A in Example 14 was changed to 0.5% by mass based on the total amount of the electrolytic solution.

Comparative Example 8

A lithium ion secondary battery was produced in the same manner as in Example 14, except that the compound A was not used in Example 14.

Comparative Example 9

A lithium ion secondary battery was produced in the same manner as in Example 14, except that 0.5% by mass of FEC in place of the compound A in Example 14 was added based on the total amount of the electrolytic solution.

[Initial Charge/Discharge]

Each of the secondary batteries of Examples 14 to 15 and Comparative Examples 8 to 9 was subjected to the initial charge/discharge by the same method as the method in Examples 6 to 8 and Comparative Example 4.

[Measurement of Amount of Volume Change]

Figure 13:
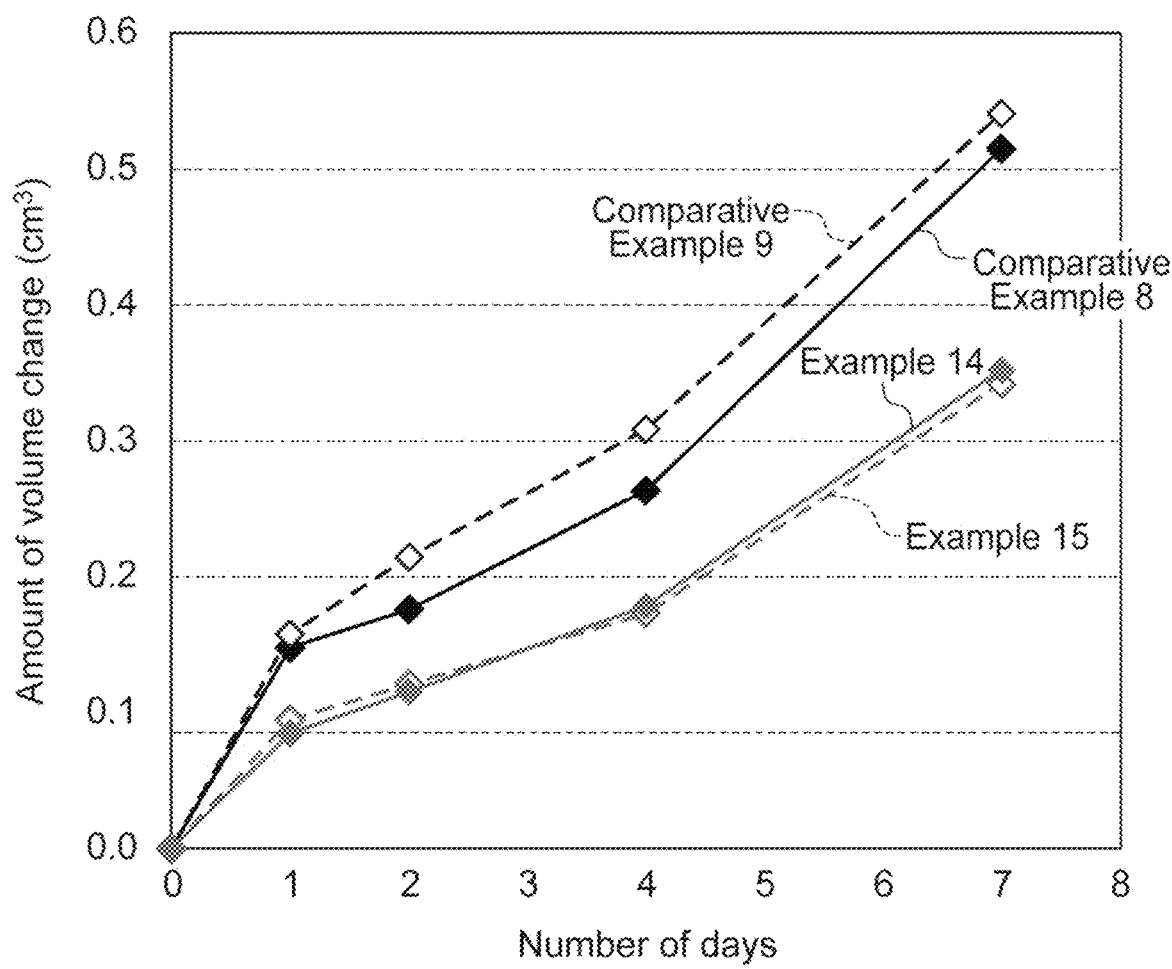
FIG. 13 shows a graph showing measurement results of amounts of volume changes of Examples 14 to 15 and Comparative Examples 8 to 9.

Each of the secondary batteries of Examples 14 to 15 and Comparative Examples 8 to 9 was stored at 80° C. for 7 days. The volumes of the secondary batteries were measured every day with an electronic densimeter based on the Archimedes method (Electronic Densimeter MDS-300, manufactured by Alfa Mirage Co. Ltd.), and the differences from the volumes of the secondary batteries before storage (day 0) were determined, respectively. The results are shown in FIG. 13.

[Measurement of Discharge DCR]

Each of the secondary batteries of Examples 14 to 15 and Comparative Examples 8 to 9 was stored at 80° C. for 1 week. The direct current resistances at the time of the discharge (discharge DCR) of the secondary battery before and after the storage were measured in the following way.

Figure 14:
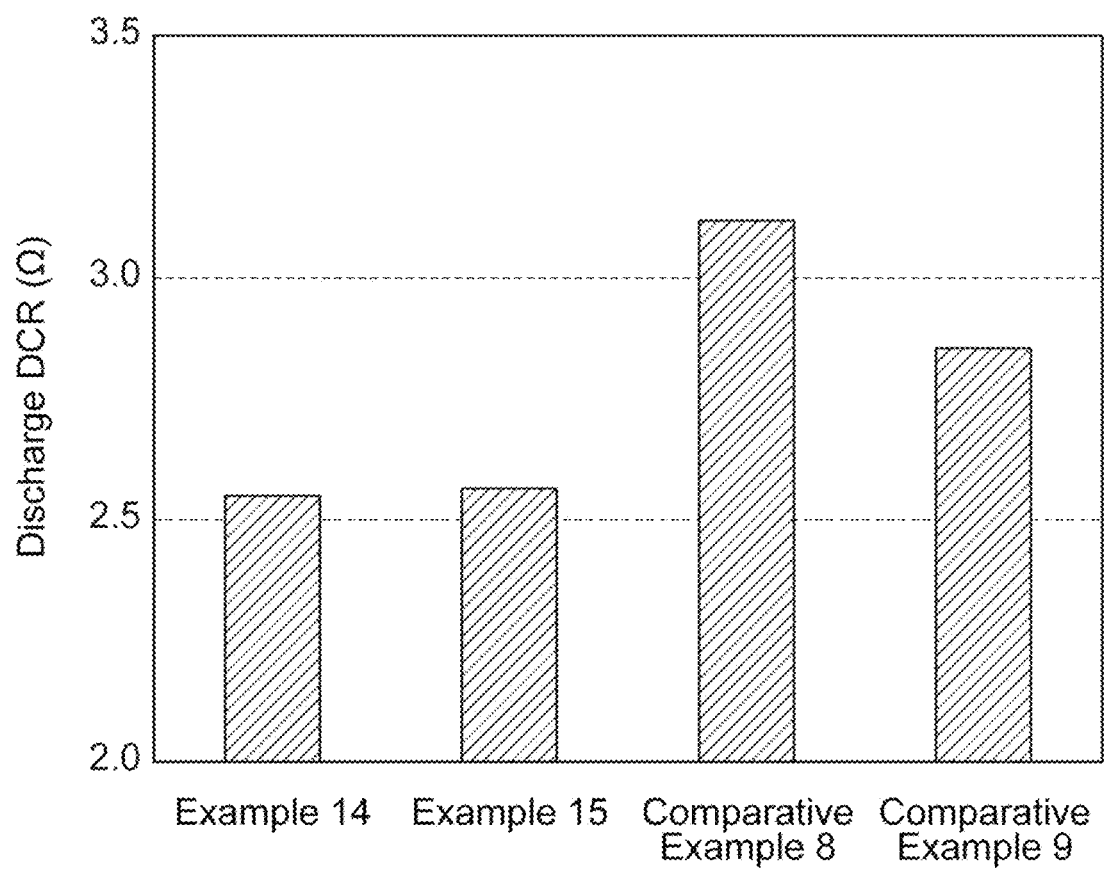
FIG. 14 shows a graph showing measurement results of discharge DCR of Examples 14 to 15 and Comparative Examples 8 to 9.

Firstly, a constant current charge at 0.2 C was performed up to the upper limit voltage of 4.2 V, and then a constant-voltage charge was performed at 4.2 V. The charge termination condition was set at a current value of 0.02 C. After that, the constant current discharge was performed at a current value of 0.2 C to a final voltage of 2.7 V, and the current value at this time was determined to be I$_{0.2\ C}$, and the change of the voltage after 10 seconds after the start of discharge was determined to be ΔV$_{0.2\ C}$. Next, the constant current charge at 0.2 C was performed up to the upper limit voltage of 4.2 V, subsequently the constant-voltage charge was performed at 4.2 V (where the charge termination condition was set at the current value of 0.02 C), then the constant current discharge was performed at a current value of 0.5 C to the final voltage of 2.7 V, the current value at this time was determined to be I$_{0.5\ C}$, and the change of the voltage after 10 seconds after the start of discharge was determined to be ΔV$_{0.5\ C}$. A current value of 1 C was determined to be I$_{1\ C}$ from similar charge/discharge, and ΔV$_{1\ C}$ was evaluated which was the change of the voltage after 10 seconds after the start of discharge. A first approximation straight line was drawn by the application of the least-squares method to a current value-voltage change plot of three points of (I$_{0.2\ C}$ and ΔV$_{0.2\ C}$), (I$_{0.5\ C}$ and ΔV$_{0.5\ C}$) and (I$_{1\ C}$ and ΔV$_{1\ C}$), and the gradient was determined to be the value of the discharge DCR. The results are shown in FIG. 14.

REFERENCE SIGNS LIST

1 . . . Non-aqueous electrolytic solution secondary battery (electrochemical device), 6 . . . Positive electrode, 7 . . . Separator, 8 . . . Negative electrode.

The invention claimed is:

1. An electrolytic solution comprising a compound represented by the following formula (1):

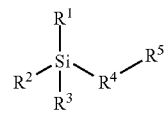

(1)

wherein R$^1$ to R$^3$ each independently represent an alkyl group or a fluorine atom, R$^4$ represents an alkylene group, and R$^5$ represents an organic group comprising a sulfur atom, wherein a number of silicon atoms in one molecule of the compound represented by the formula (1) is one, wherein at least one of R$^1$ to R$^3$ is a fluorine atom, and wherein a content of the compound represented by the formula (1) is 10% by mass or less based on a total amount of the electrolytic solution.

2. The electrolytic solution according to claim 1, wherein R$^5$ is a group represented by any of the following formula (2), formula (3) and formula (4):

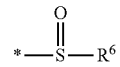

(2)

wherein R$^6$ represents an alkyl group, and * represents a bond;

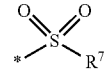

(3)

wherein R$^7$ represents an alkyl group, and * represents a bond; and

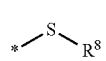

(4)

wherein R[8] represents an alkyl group, and * represents a bond.

3. An electrochemical device comprising:
a positive electrode;
a negative electrode; and
the electrolytic solution according to claim 1.

4. The electrochemical device according to claim 3, wherein the negative electrode comprises a carbon material.

5. The electrochemical device according to claim 4, wherein the carbon material comprises graphite.

6. The electrochemical device according to claim 4, wherein the negative electrode further comprises a material comprising at least one element of the group consisting of silicon and tin.

7. The electrochemical device according to claim 3, wherein the electrochemical device is a non-aqueous electrolytic solution secondary battery or a capacitor.

* * * * *